US012683728B2

(12) United States Patent
Mu

(10) Patent No.: US 12,683,728 B2
(45) Date of Patent: Jul. 14, 2026

(54) DATA TRANSMISSION METHOD AND APPARATUS, COMMUNICATION DEVICE AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 821 days.

(21) Appl. No.: 17/800,064

(22) PCT Filed: Feb. 19, 2020

(86) PCT No.: PCT/CN2020/075868
§ 371 (c)(1),
(2) Date: Feb. 3, 2023

(87) PCT Pub. No.: WO2021/163925
PCT Pub. Date: Aug. 26, 2021

(65) Prior Publication Data
US 2024/0267170 A1     Aug. 8, 2024

(51) Int. Cl.
*H04L 5/00*              (2006.01)
(52) U.S. Cl.
CPC .................................. *H04L 5/0016* (2013.01)
(58) Field of Classification Search
CPC ....... H04L 5/0016; H04L 1/0026; H04L 1/08;
H04B 7/0456
See application file for complete search history.

(56) References Cited

U.S. PATENT DOCUMENTS

| | | | |
|---|---|---|---|
| 2011/0013615 A1* | 1/2011 | Lee ........................ H04L 5/0023 370/344 |
| 2012/0121034 A1* | 5/2012 | Murakami ............ H04L 1/0003 375/295 |
| 2012/0300867 A1* | 11/2012 | Chen .................... H04B 7/0456 375/267 |
| 2013/0100914 A1* | 4/2013 | Nakamura ............. H04B 7/068 375/232 |

(Continued)

FOREIGN PATENT DOCUMENTS

| | | |
|---|---|---|
| CN | 108900229 A | 11/2018 |
| WO | WO 2019029480 A1 | 2/2019 |

OTHER PUBLICATIONS

PCT/CN2020/075868 International Search Report dated Nov. 26, 2020; 2 pages.

(Continued)

*Primary Examiner* — Nicholas A Jensen
*Assistant Examiner* — Ayodele Lawrence Olubodun
(74) *Attorney, Agent, or Firm* — Cozen O'Connor

(57)                ABSTRACT

A data transmission method includes: determining data to transmitted; and carrying the data on a plurality of precoding resource units. The plurality of precoding resource units configured to carry the data adopt the same precoding matrix or different precoding matrices. The plurality of precoding resource units include a plurality of precoding time domain units, a plurality of precoding frequency domain units, or a plurality of precoding time domain units and a plurality of precoding frequency domain units.

19 Claims, 9 Drawing Sheets

(56)         References Cited

U.S. PATENT DOCUMENTS

| | | | |
|---|---|---|---|
| 2013/0114752 A1* | 5/2013 | Murakami | H04B 7/0452 |
| | | | 375/267 |
| 2014/0044218 A1* | 2/2014 | Murakami | H04B 7/0456 |
| | | | 375/299 |
| 2015/0124688 A1* | 5/2015 | Xu | H04B 7/0452 |
| | | | 370/312 |
| 2017/0041052 A1 | 2/2017 | Blankenship et al. | |
| 2020/0059278 A1* | 2/2020 | Wu | H04B 7/068 |
| 2020/0119783 A1* | 4/2020 | Liu | H04L 5/0051 |
| 2020/0195317 A1* | 6/2020 | Yasukawa | H04W 72/20 |
| 2021/0099214 A1* | 4/2021 | Ren | H04W 72/23 |
| 2022/0060364 A1* | 2/2022 | Fehri | H04L 27/2615 |
| 2022/0123813 A1* | 4/2022 | Bian | H04B 7/0456 |
| 2023/0036708 A1* | 2/2023 | Murakami | H04L 25/03891 |

OTHER PUBLICATIONS

European Patent Application No. 20919861.3, Search and Opinion dated Oct. 17, 2023, 7 pages.

\* cited by examiner

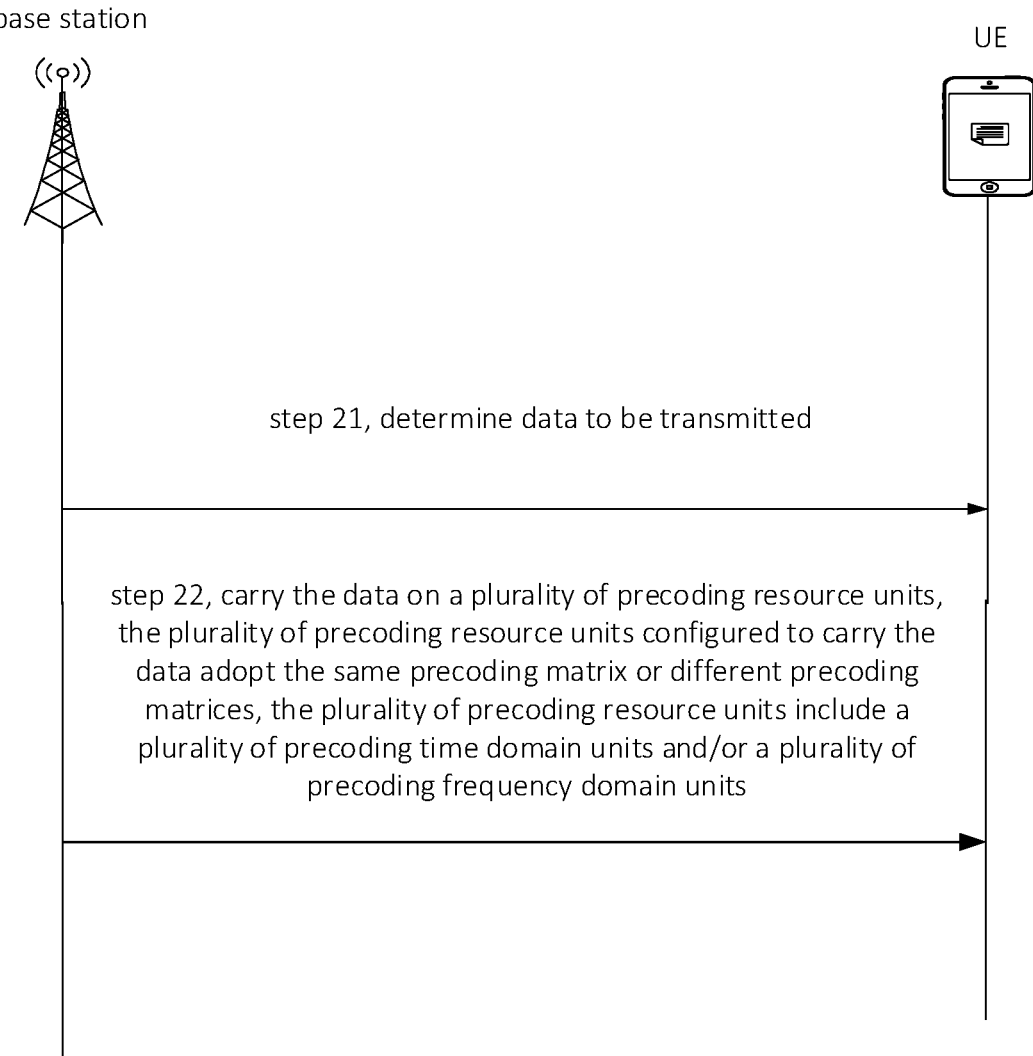

base station

UE step 21, determine data to be transmitted step 22, carry the data on a plurality of precoding resource units, the plurality of precoding resource units configured to carry the data adopt the same precoding matrix or different precoding matrices, the plurality of precoding resource units include a plurality of precoding time domain units and/or a plurality of precoding frequency domain units

FIG. 2

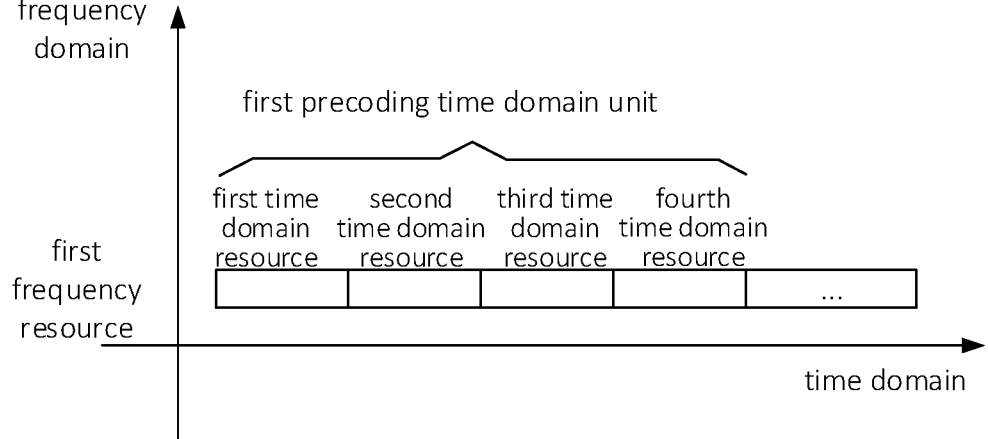

frequency domain first precoding time domain unit first time domain resource    second time domain resource    third time domain resource    fourth time domain resource first frequency resource

...

time domain

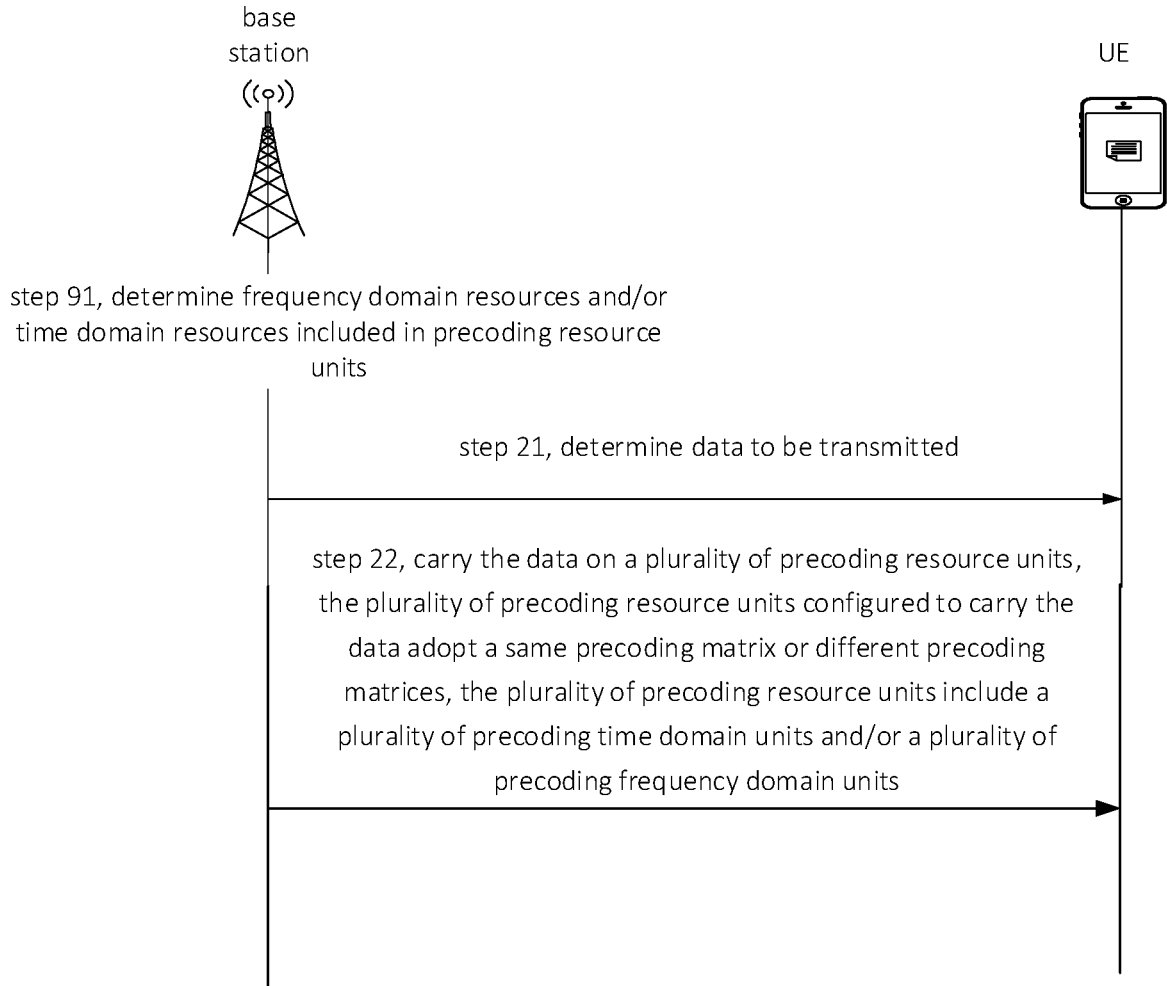

base
station

UE step 91, determine frequency domain resources and/or
time domain resources included in precoding resource
units step 21, determine data to be transmitted step 22, carry the data on a plurality of precoding resource units,
the plurality of precoding resource units configured to carry the
data adopt a same precoding matrix or different precoding
matrices, the plurality of precoding resource units include a
plurality of precoding time domain units and/or a plurality of
precoding frequency domain units

FIG. 9

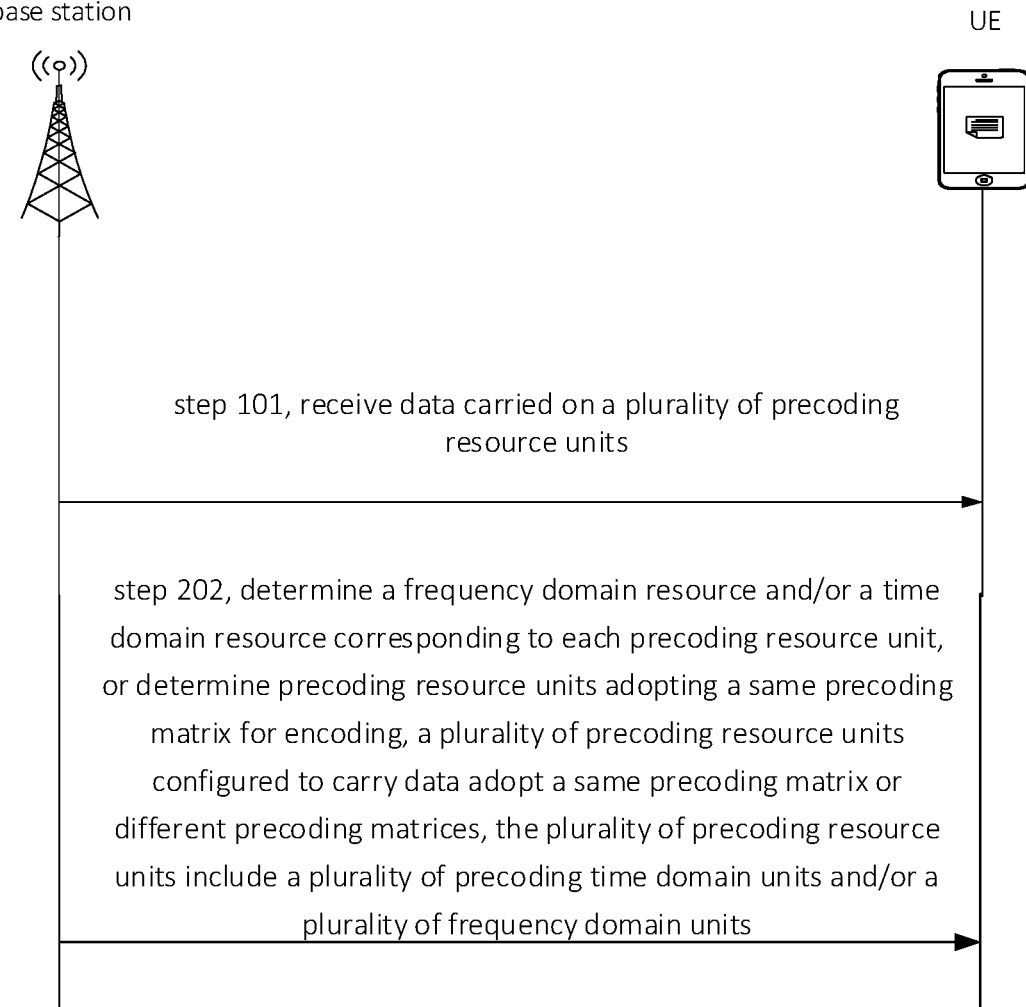

base station

UE step 101, receive data carried on a plurality of precoding resource units step 202, determine a frequency domain resource and/or a time domain resource corresponding to each precoding resource unit, or determine precoding resource units adopting a same precoding matrix for encoding, a plurality of precoding resource units configured to carry data adopt a same precoding matrix or different precoding matrices, the plurality of precoding resource units include a plurality of precoding time domain units and/or a plurality of frequency domain units

FIG. 10

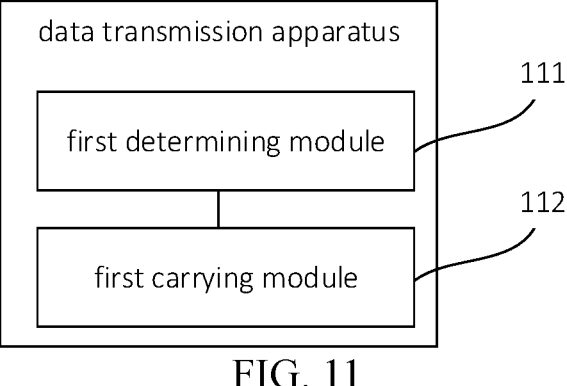

data transmission apparatus first determining module          111 first carrying module          112

FIG. 11

DATA TRANSMISSION METHOD AND APPARATUS, COMMUNICATION DEVICE AND STORAGE MEDIUM

CROSS-REFERENCE TO RELATED APPLICATION

This application is a U.S. national phase application of International Application No. PCT/CN2020/075868, filed on Feb. 19, 2020, the content of which is hereby incorporated by reference in its entirety for all purposes.

TECHNICAL FIELD

The disclosure relates to, but is not limited to, a field of wireless communication technologies, and more particularly, to a data communication method, a data communication apparatus, a communication device and a storage medium.

BACKGROUND

In the LTE 4G system, Machine Type Communication (MTC) and Narrow Band Internet of Things (NB-IoT) are proposed to support the IoT services. These two technologies are mainly aimed at application scenarios benefitting from low speed and high latency, such as, the meter reading, environmental monitoring and similar scenarios.

SUMMARY

According to a first aspect of the disclosure, a data transmission method is provided. The method includes:
  determining data to be transmitted;
  carrying the data by a plurality of precoding resource units; in which, the plurality of precoding resource units configured to carry the data adopt a same precoding matrix or different precoding matrices, and the plurality of precoding resource units include: a plurality of precoding time domain units, a plurality of precoding frequency domain units, or a plurality of precoding time domain units and a plurality of precoding frequency domain units.

According to a second aspect of the disclosure, a data transmission method is provided. The method includes:
  receiving data carried on a plurality of precoding resource units;
  determining a frequency domain resource, a time domain resource, or the frequency domain resource and the time domain resource corresponding to each precoding resource unit; or determining precoding resource units adopting the same precoding matrix to encode data; in which a plurality of precoding resource units configured to carry the data adopt the same precoding matrix or different precoding matrices; the plurality of precoding resource units include a plurality of precoding time domain units, a plurality of precoding frequency domain units, or a plurality of precoding time domain units and a plurality of precoding frequency domain units.

According to a third aspect of the disclosure, a communication device is provided. The communication device includes:
  an antenna;
  a memory; and
  a processor, connected to the antenna and the memory respectively, configured to control the antenna to send and receive radio signals by executing an executable program stored on the memory, and capable of determining data to be transmitted; and carrying the data by a plurality of precoding resource units; in which, the plurality of precoding resource units configured to carry the data adopt a same precoding matrix or different precoding matrices, and the plurality of precoding resource units include: a plurality of precoding time domain units, a plurality of precoding frequency domain units, or a plurality of precoding time domain units and a plurality of precoding frequency domain units. Alternatively, the processor is capable of receiving data carried on a plurality of precoding resource units; and determining a frequency domain resource, a time domain resource, or the time domain resource and the frequency domain resource corresponding to each precoding resource unit; or determining precoding resource units adopting the same precoding matrix to encode data; in which a plurality of precoding resource units configured to carry the data adopt the same precoding matrix or different precoding matrices; the plurality of precoding resource units include a plurality of precoding time domain units, a plurality of precoding frequency domain units.

According to a fourth aspect of the disclosure, a non-transitory computer-readable storage medium is provided. The non-transitory computer-readable storage medium is configured to store an executable program. When the executable program is executed by a processor, the data transmission method is performed. The method includes determining data to be transmitted; and carrying the data by a plurality of precoding resource units; in which, the plurality of precoding resource units configured to carry the data adopt a same precoding matrix or different precoding matrices, and the plurality of precoding resource units include: a plurality of precoding time domain units, a plurality of precoding frequency domain units, or a plurality of precoding time domain units and a plurality of precoding frequency domain units. Alternatively, the method includes receiving data carried on a plurality of precoding resource units; and determining a frequency domain resource, a time domain resource, or the frequency domain resource and the time domain resource corresponding to each precoding resource unit; or determining precoding resource units adopting the same precoding matrix to encode data; in which a plurality of precoding resource units configured to carry the data adopt the same precoding matrix or different precoding matrices; the plurality of precoding resource units include a plurality of precoding time domain units, a plurality of precoding frequency domain units, or a plurality of precoding time domain units and a plurality of precoding frequency domain units.

BRIEF DESCRIPTION OF THE DRAWINGS

FIG. 2 is a schematic diagram illustrating a data transmission method in accordance with an embodiment of the disclosure.

FIG. 3 is a schematic diagram illustrating a time-frequency domain distribution in accordance with an embodiment of the disclosure.

FIG. 4 is a schematic diagram illustrating a time-frequency domain distribution in accordance with another embodiment of the disclosure.

FIG. 9 is a schematic diagram illustrating a data transmission method in accordance with another embodiment of the disclosure.

FIG. 10 is a schematic diagram illustrating a data transmission method in accordance with another embodiment of the disclosure.

FIG. 11 is a schematic diagram illustrating a data transmission apparatus in accordance with another embodiment of the disclosure.

DETAILED DESCRIPTION

Embodiments will be described in detail herein, examples of which are illustrated in the accompanying drawings. In the following description related to the drawings, the same numerals in different drawings refer to the same or similar elements unless otherwise indicated. The implementations described in the following embodiments do not represent all implementations consistent with embodiments of the disclosure. Rather, they are merely examples of apparatus and methods consistent with some aspects of embodiments of the disclosure as recited in the appended claims.

The terms used in the embodiments of the disclosure are only for the purpose of describing particular embodiments, and are not intended to limit the embodiments of the disclosure. As used in the embodiments of the description and the appended claims, the singular forms "a," "an" are intended to include the plural forms as well, unless the context clearly dictates otherwise. It is understandable that the term "and/or" as used herein refers to and includes any one and all possible combinations of one or more of the associated listed items.

It is understandable that although the terms first, second, third, etc. may be used in embodiments of the disclosure to describe various pieces of information, such information should not be limited to these terms. These terms are only used to distinguish the same type of information from each other. For example, the first information may also be referred to as the second information, and similarly, the second information may also be referred to as the first information without departing from the scope of the embodiments of the disclosure. Depending on the context, the word "if" as used herein can be interpreted as "at the time of" or "when" or "in response to determining."

Figure 1:
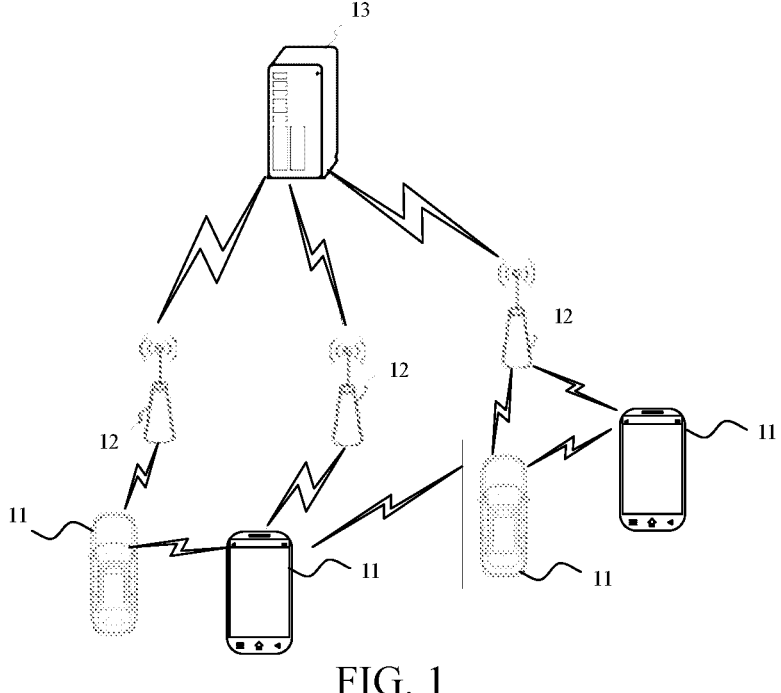
FIG. 1 is a schematic structural diagram illustrating a wireless communication system in accordance with an embodiment of the disclosure.

FIG. 1 is a schematic structural diagram illustrating a wireless communication system in accordance with an embodiment of the disclosure. As illustrated in FIG. 1, the wireless communication system is a communication system based on the cellular mobile communication technology. The wireless communication system may include several terminals 11 and several base stations 12.

The terminal 11 may be a device that provides voice and/or data connectivity to the user. The terminal 11 may communicate with one or more core networks via a Radio Access Network (RAN). The terminal 11 may be an Internet of Thing (IoT) terminal, such as a sensor device, a mobile phone (or "cellular" phone), or a computer with an IoT terminal, such as a fixed device, a portable device, a pocket device, a hand-held device, a computer built-in device or a vehicle-mounted device. For example, Station (STA), subscriber unit, subscriber station, mobile station, mobile, remote station, access point, remote terminal, access terminal, user terminal, user agent, user device, or user equipment (UE). Alternatively, the terminal 11 may be a device of unmanned aerial vehicle. Alternatively, the terminal 11 may be a vehicle-mounted device, such as a trip computer with a wireless communication function, or a wireless communication device externally connected to the trip computer. Alternatively, the terminal 11 may be a roadside device, such as a street light, a traffic light, or other roadside devices with a wireless communication function.

The base station 12 may be a network-side device in the wireless communication system. The wireless communication system may be the 4th generation mobile communication (4G) system, also known as Long Term Evolution (LTE) system. Alternatively, the wireless communication system may be a 5th generation mobile communication (5G) system, also known as new radio (NR) system or 5G NR system. Alternatively, the wireless communication system may be a next-generation system of the 5G system. The access network in the 5G system may be called New Generation-Radio Access Network (NG-RAN). Alternatively, the wireless communication system can be a Machine Type Communication (MTC) system.

The base station 12 may be an evolved base station (eNB) of the 4G system. Alternatively, the base station 12 may be a base station (gNB) that adopts a centralized-distributed architecture of the 5G system. When adopting the centralized-distributed architecture, the base station 12 usually includes a central unit (CU) and at least two distributed units (DU). The central unit is provided with a protocol stack of Packet Data Convergence Protocol (PDCP), Radio Link Control (RLC), and Medium Access Control (MAC). The distributed unit is provided with a protocol stack of a physical (PHY) layer. Embodiments of the disclosure not limit the implementation form of the base station 12.

A radio connection can be established between the base station 12 and the terminal 11 through the radio air interface. In different implementations, the radio air interface can be based on the 4G or based on 5G. For example, the radio air interface is the new radio, or the radio air interface can be a radio air interface based on the next-generation of the 5G.

In some embodiments, an E2E (End to End) connection can be established between terminals 11. For example, Vehicle to Vehicle (V2V) communication, Vehicle to Infrastructure (V2I) and Vehicle to Pedestrian (V2P) communication in the Vehicle to Everything (V2X) communication.

In some embodiments, the above wireless communication system may also include a network management device 13.

The base stations 12 are respectively connected to the network management device 13. The network management device 13 may be a core network device in the wireless communication system. For example, the network management device 13 may be a Mobility Management Entity (MME) in an Evolved Packet Core (EPC). Alternatively, the network management device can be other core network devices, such as Serving Gate Way (SGW), Public Data Network Gate Way (PGW), Policy and Charging Rules Function (PCRF), or Home Subscriber Server (HSS), etc. Embodiments of the disclosure do not limit the implementation form of the network management device 13.

In order to better understand the technical solutions provided in any of embodiments of the disclosure, applications of the IoT based on the 5G new radio (NR) will be described through embodiments.

A maximum rate supported by narrow band Internet of Thing (NB-IoT) is hundreds of Kbps and the maximum rate supported by the Machine Type Communication (MTC) is a few Mbps. However, with the continuous development of IoT services, such as the popularization of video surveillance, smart home, wearable devices, industrial sensor monitoring and other services, these services usually require the rate of tens to one hundred Mbps and have a relatively high demand on the low latency. Therefore, the MTC and the NB-IoT technology when used in the LTE network has difficulty meeting these demands. Based on this situation, it is proposed to design a new IoT technology in the 5G NR to meet the needs of covering such mid-range IoT devices.

Similar to the IoT device in the LTE, the IoT based on 5G NR usually needs to meet the following requirements: 1. low cost and low complexity, 2. a certain degree of coverage enhancement, 3. power saving. Since the NR is designed for high-end terminals of high-speed and low-latency, NR will not meet the above requirements. Therefore, the NR system needs to be modified to meet the above requirements. For example, in order to meet the requirements of low cost and low complexity, the radio frequency (RF) bandwidth of the IoT can be limited or the size of the IoT cache can be limited to further limit each received transmission block. For example, the RF bandwidth can be limited to 5 M Hz or 10 M Hz. For power saving, the optimization can be made to by simplifying communication processes, reducing the number of times of detecting the downlink control channel by IoT users, and so on.

For the IoT users, since the capabilities of the terminal, such as the bandwidth or the number of receiving antennas are limited, this limitation will have a negative impact on the coverage of the terminal. Therefore, a coverage enhancement scheme is required. In order to enhance coverage, a commonly used coverage enhancement scheme is repeated data transmission. For example, the same information is sent repeatedly in the time domain, and the data is received at the terminal in combination. In the NR, the sending end needs to perform precoding on the data to be sent. The selection of a precoding matrix can be based on channel status information (CSI) feedback from the user, or the precoding matrix can be selected randomly. In the NR system, since it is basically single transmission, the system does not provide a solution to select a precoding matrix in multi repeated transmission.

Therefore, embodiments of the disclosure provide a data communication method. Data to be transmitted is determined and the data is carried on a plurality of precoding resource units. The plurality of precoding resource units configured to carry the data adopt a same precoding matrix or different precoding matrices and the plurality of precoding resource units include a plurality of precoding time domain units, a plurality of precoding frequency domain units, or the plurality of time domain units and the plurality of precoding frequency domain units. Here, since the data carried on each precoding resource unit can be encoded by adopting the same precoding matrix, when the receiving end receives the data packet, the data carried on each precoding resource unit is integrally processed in the same manner since the data carried on each precoding resource unit have the same encoding characteristic, thereby improving the data processing efficiency and the data processing accuracy.

As illustrated in FIG. 2, embodiments of the disclosure provide a data transmission method, performed by a sending end. The method includes the following.

At step 21, data to be transmitted is determined.

At step 22, the data is carried on a plurality of precoding resource units. The plurality of precoding resource units configured to carry data adopt the same or different precoding matrices. The plurality of precoding resource units include: a plurality of precoding time domain units and/or a plurality of precoding frequency domain units.

In all embodiments of the disclosure and throughout the disclosure, the term "a plurality of" refers to one or more than one.

In some embodiments of the disclosure, the sending end may be a base station or a terminal.

In some embodiments, the transmitting end is a base station, and a receiving end is a terminal. The terminal can be a water meter, an electricity meter, an environmental monitoring sensor, an industrial wireless sensor, a wearable device, or the like.

In some embodiments, in transmitting the data to the receiving end, the sending end needs to perform precoding on the data to be transmitted with a precoding matrix.

In some embodiments, both the base station and the terminal may know precoding matrices in advance, and the base station or the terminal will select a precoding matrix that can maximize the channel matrix capacity to encode the data. Here, performing the precoding on the data may refer to multiplying the data to be transmitted by the precoding matrix.

The precoding resource unit is the unit of transmission resource, including: one or more physical resources. These one or more physical resources can be one or more time domain resources or one or more frequency domain resources. In some embodiments, the precoding resource units may be a plurality of physical resources distributed in time domain and frequency domain.

The plurality of precoding resource units include a plurality of precoding time domain units and/or a plurality of precoding frequency domain units. That is, the plurality of precoding resource units may be a plurality of precoding time domain units, a plurality of precoding frequency domain units, or a plurality of precoding time domain units and a plurality of precoding frequency domain units.

In some embodiments, the plurality of precoding time domain units are one or more time domain resources on the same frequency domain resource, and the plurality of precoding time domain units adopt the same precoding matrix.

Alternatively, the plurality of precoding time domain units are one or more time domain resources on different frequency domain resources, and the plurality of precoding time domain units adopt the same precoding matrix.

In some embodiments, the plurality of precoding frequency domain units are one or more frequency domain resources on the same time domain resource, and the plurality of precoding frequency domain units adopt the same precoding matrix.

Alternatively, the plurality of precoding frequency domain units are one or more frequency domain resources on different time domain resources, and the plurality of precoding frequency domain units adopt the same precoding matrix.

In embodiment of the disclosure, the time domain resource may be slot, symbol, subframe, or the like. The frequency domain resource may be physical resource block (PRB), resource element group (REG), REG bundle, or the like.

In some embodiments, the plurality of time domain resources may be one or more slots. The plurality of frequency domain resources may be one or more PRBs. Here, in the case that the precoding resource unit includes the plurality of time domain resources, the precoding resource unit may be a plurality of continuous time domain resources. For example, the precoding resource unit may be a plurality of slots, and these slots may be continuous. Alternatively, these slot can be discontinuous, or some of them are continuous and other parts are discontinuous. In the case that the precoding frequency domain unit includes the plurality of frequency domain resources, the precoding resource unit may be a plurality of frequency domain resources. For example, the precoding resource unit may be a plurality of PRBs. These PRBs may be continuous or discontinuous, or some of them are continuous and other parts are discontinuous.

In some embodiments, in the case that the precoding resource unit includes the plurality of time domain resources, the precoding resource unit may be a plurality of discrete time domain resources. For example, the precoding resource unit may be a plurality of discrete slots. In the case that the precoding frequency domain unit includes the plurality of frequency domain resources, the precoding resource unit may be a plurality of discrete frequency domain resources. For example, the precoding resource unit may be a plurality of discrete PRBs.

In some embodiments, one data may be carried on one precoding resource unit, or may be divided into a plurality of sub-data and the plurality of sub-data are carried on the plurality of precoding resource units. For example, when the data includes first sub-data and second sub-data, the first sub-data may be carried on a first precoding resource unit, and the second sub-data may be carried on a second precoding resource unit.

In some embodiments, the precoding resource units are the precoding time domain units and the precoding time domain units include a plurality of different time domain resources on the same frequency domain resource.

In some embodiments, as illustrated in FIG. 3, the frequency domain resource is a first frequency domain resource, and the time domain resources include a first time domain resource, a second time domain resource, a third time domain resource and a fourth time domain resource. Therefore, the first precoding time domain unit may include the first time domain resource, the second time domain resource, the third time domain resource, and the fourth time domain resource on the first frequency domain resource.

In some embodiments, how many different time domain resources the precoding time domain unit includes may be specified by a communication protocol, or determined by the network side and instructed by the terminal side, or negotiated by the network side and the terminal side, or reported by the terminal side to the network side, or determined based on preset rules. In some embodiments, a first communication protocol stipulates that the precoding time domain unit includes three different time domain resources on the same frequency domain resource, and a second communication protocol stipulates that the precoding time domain unit includes four different time domain resources on the same frequency domain resource. Here, when the sending end performs the communication based on a corresponding communication protocol, the number of time domain resources included in each precoding time domain unit can be determined.

In some embodiments, the precoding time domain unit includes a plurality of continuous time domain resources on the same frequency domain resource. In some embodiments, the precoding time domain unit includes a plurality of discrete time domain resources on the same frequency domain resource.

In some embodiments, the data carried on different precoding time domain units is encoded by adopting different precoding matrices.

Figure 4:
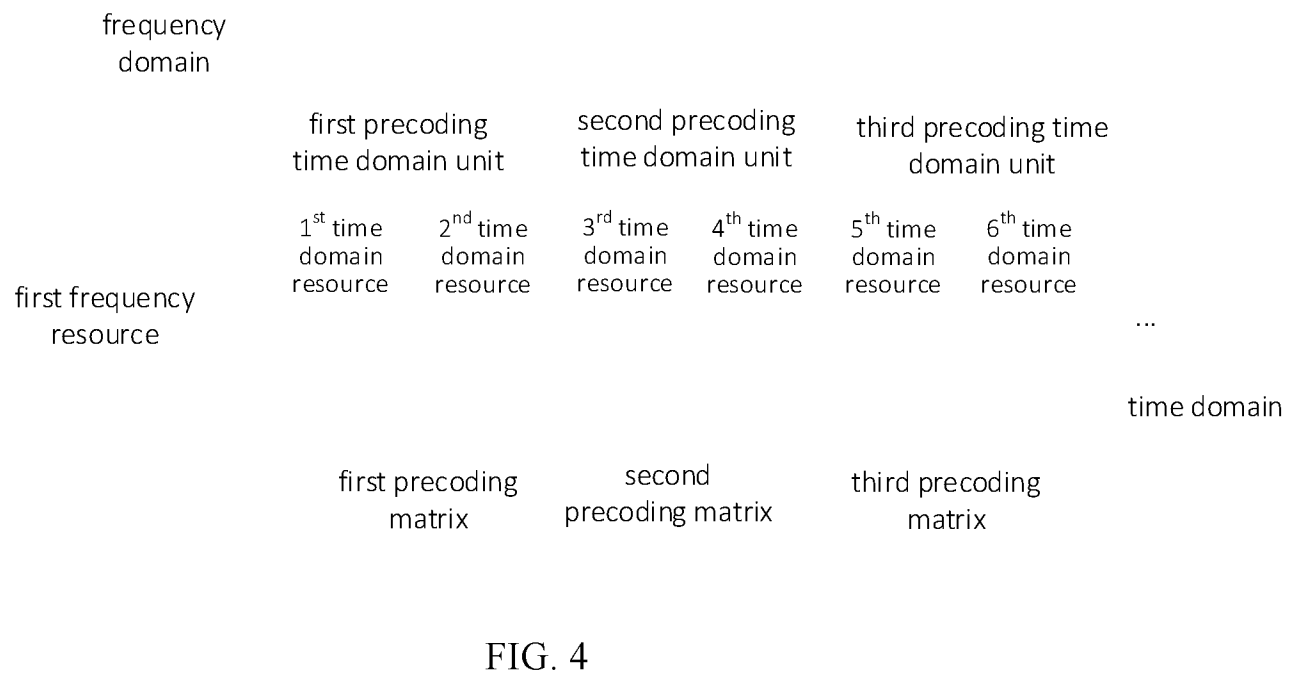

In some embodiments, as illustrated in FIG. 4, there are a plurality of continuously distributed time domain resources on the first frequency domain resource. In the following, there are 6 time domain resources on one precoding frequency domain unit is taken as an example. In this case, on one precoding frequency domain unit, there includes: a first time domain resource, a second time domain resource, a third time domain resource, a fourth time domain resource, a fifth time domain resource and a sixth time domain resource. A first precoding time domain unit includes the first time domain resource and the second time domain resource, a second precoding time domain unit includes the third time domain resource and the fourth time domain resource, and a third precoding time domain unit includes the fifth time domain resource and the sixth time domain unit. The precoding matrices includes a first precoding matrix, a second precoding matrix and a third precoding matrix. In some embodiments, the data carried on the first precoding time domain unit is encoded by adopting the first precoding matrix, the data carried on the second precoding time domain unit is encoded by adopting the second precoding matrix, and the data carried on the third precoding time domain unit is encoded by adopting the third precoding matrix.

In some embodiments, the precoding resource units are the precoding frequency domain units, and the precoding frequency domain units include a plurality of different frequency domain resources on the same time domain resource.

Figure 5:
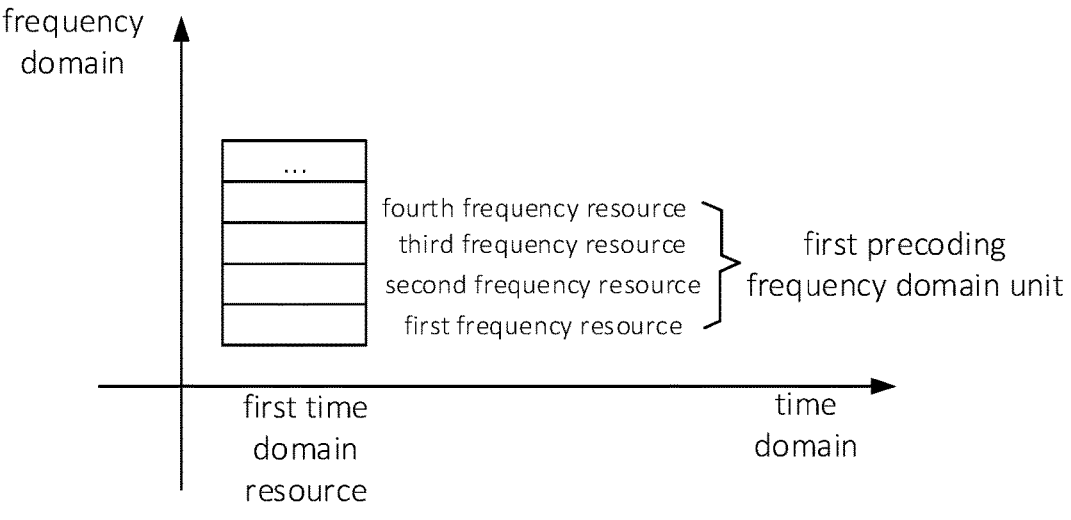
FIG. 5 is a schematic diagram illustrating a time-frequency domain distribution in accordance with another embodiment of the disclosure.

In some embodiments, as illustrated in FIG. 5, the time domain resource is a first time domain resource, and the frequency domain resources include a first frequency domain resource, a second frequency domain resource, a third frequency domain resource and a fourth frequency domain resource. Therefore, the first precoding frequency domain unit may include the first frequency domain resource, the second frequency domain resource, the third frequency domain resource and the fourth frequency domain resource on the first time domain resource.

In some embodiments, how many different frequency domain resources the precoding frequency domain unit includes may be specified by a communication protocol. In some embodiments, a first communication protocol specifies that the precoding frequency domain unit includes three different frequency domain resources on the same time domain resource, and a second communication protocol specifies that the precoding frequency domain unit includes four different frequency domain resources on the same time domain resource. Here, when the sending end performs the communication based on a corresponding communication protocol, the number of frequency domain resources included in each precoding frequency domain unit can be determined.

In some embodiments, the precoding frequency domain unit includes a plurality of continuous frequency domain resources on the same time domain resource. In some embodiment, the precoding frequency domain unit includes a plurality of discrete frequency domain resources on the same time domain resource.

In some embodiments, the data carried on different precoding frequency domain units is encoded by adopting different precoding matrices.

Figure 6:
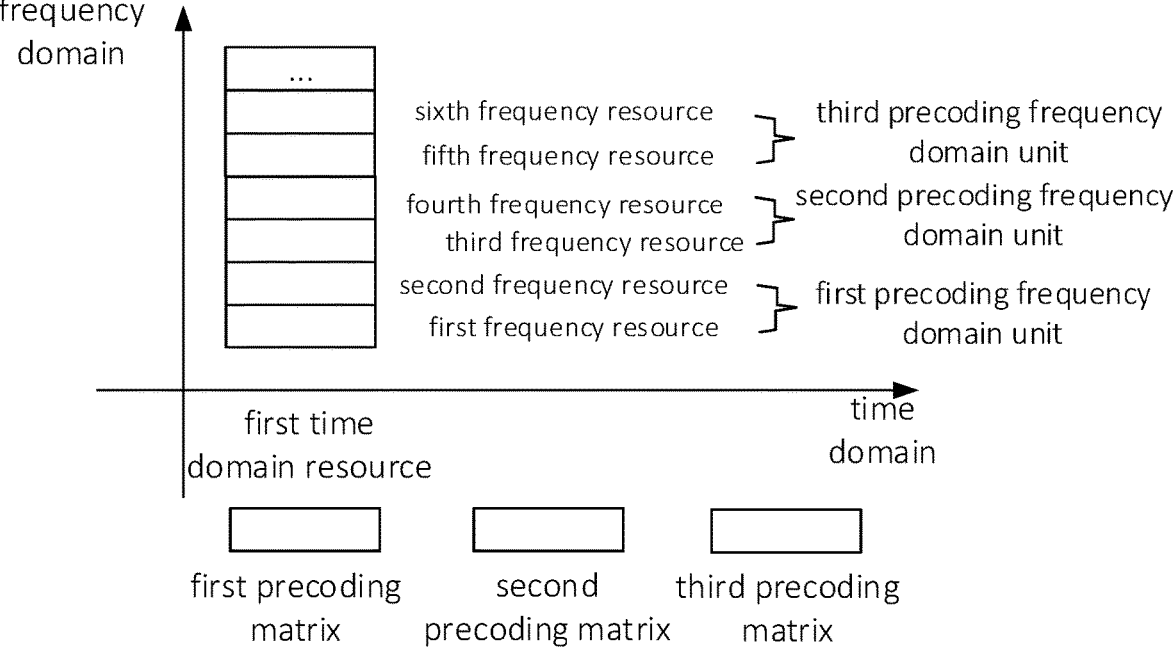
FIG. 6 is a schematic diagram illustrating a time-frequency domain distribution in accordance with another embodiment of the disclosure.

In some embodiments, as illustrated in FIG. 6, there are continuously distributed first frequency domain resource, a second frequency domain resource, a third frequency domain resource, a fourth frequency domain resource, a fifth frequency domain resource and a sixth frequency domain resource continuously distributed on the first time domain resource. The first precoding frequency domain unit includes the first frequency domain resource and the second frequency domain resource, the second precoding frequency domain unit includes the third frequency domain resource and the fourth frequency domain resource, and the third precoding frequency domain unit includes the fifth frequency domain resources and the sixth frequency domain resource. The precoding matrices include a first precoding matrix, a second precoding matrix and a third precoding matrix. In some embodiments, the data carried on the first precoding frequency domain unit is encoded by adopting the first precoding matrix, the data carried on the second precoding frequency domain unit is encoded by adopting the second precoding matrix, and the data carried on the third precoding frequency domain unit is encoded by adopting the third precoding matrix.

Alternatively, in the same time domain, the data carried on at least a part of the different precoding frequency domain units is encoded by adopting the same precoding matrix.

Figure 7:
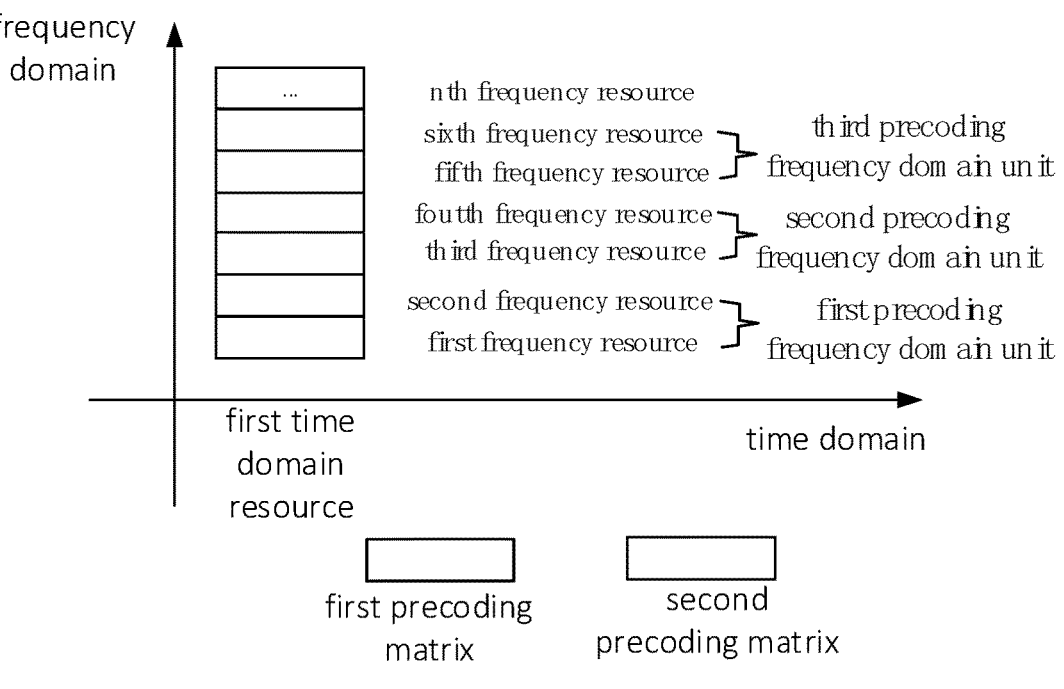
FIG. 7 is a schematic diagram illustrating a time-frequency domain distribution in accordance with another embodiment of the disclosure.

In some embodiments, as illustrated in FIG. 7, there are continuously distributed first frequency domain resource, second frequency domain resource, third frequency domain resource, fourth frequency domain resource, fifth frequency domain resource and the sixth frequency domain resource on the first time domain resource. The first precoding frequency domain unit includes the first frequency domain resource and the second frequency domain resource, the second precoding frequency domain unit includes the third frequency domain resource and the fourth frequency domain resource, and the third precoding frequency domain unit includes the fifth frequency domain resource and the sixth frequency domain resource. In some embodiments, at least two of the first precoding frequency domain unit, the second precoding frequency domain unit and the third precoding frequency domain unit adopt the same precoding matrix. For example, the first precoding frequency domain unit and the second precoding frequency domain unit adopt a first precoding matrix, and the third precoding frequency domain unit adopts a second precoding matrix.

In some embodiments, in the same time domain, encoding the data carried on at least a part of the different precoding frequency domain units adopting the same precoding matrix includes: in the same time domain, encoding the data carried on all of the different precoding frequency domain units by adopting the same precoding matrix.

Figure 8:
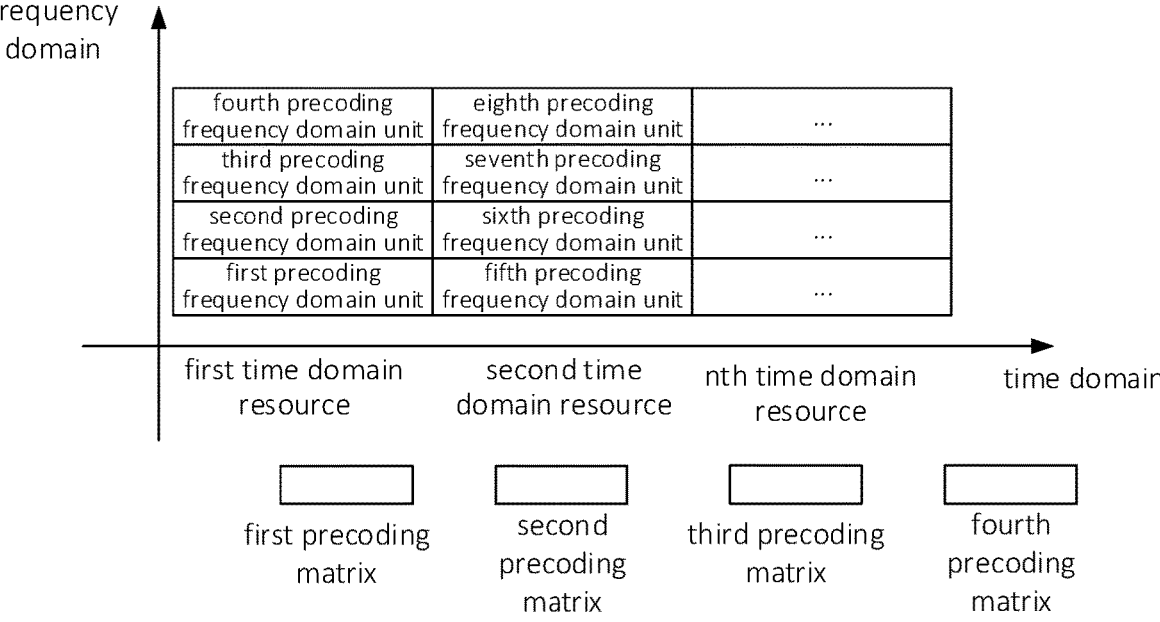
FIG. 8 is a schematic diagram illustrating a time-frequency domain distribution in accordance with another embodiment of the disclosure.

In some embodiments, as illustrated in FIG. 8, there are a first precoding frequency domain unit, a second precoding frequency domain unit, a third precoding frequency domain unit, and a fourth precoding frequency domain unit on a first time domain resource. There are a fifth precoding unit, a sixth precoding unit, a seventh precoding unit and an eighth precoding unit on a second time domain resource. The data carried on the first precoding frequency domain unit, the second precoding frequency domain unit, the third precoding frequency domain unit, and the fourth precoding frequency domain unit on the first time domain resource is encoded by adopting a first precoding matrix. The data carried on the fifth precoding unit, the sixth precoding unit, the seventh precoding unit, and the eighth precoding unit on the second time domain resource is encoded by adopting a second precoding matrix.

Alternatively, in the same time domain, the data carried on a continuously distributed part of the different precoding frequency domain units is encoded by adopting the same precoding matrix.

In some embodiments, as illustrated in FIG. 8 again, on the first time domain resource, the data carried on the first precoding frequency domain unit and the second precoding frequency domain unit is encoded by adopting a first coding matrix, and the data carried on the third precoding frequency domain unit and the fourth precoding frequency domain unit is encoded by adopting a second precoding matrix. On the second time domain resource, the data carried on the fifth precoding frequency domain unit and the sixth precoding frequency domain unit is encoded by adopting a third coding matrix, and the data carried on the seventh precoding frequency domain unit and the eighth precoding frequency domain unit is encoded by adopting a fourth precoding matrix.

In some embodiments, the precoding resource units are the precoding time domain unit and precoding frequency domain unit. That is, the precoding resource units are a plurality of different time domain resources on a plurality of different frequency domain resources. In other words, among the precoding resource units, a part of the precoding resource units are a plurality of frequency domain resources on the same time domain resource, and another part of the precoding resource units are a plurality of time domain resources on the same frequency domain resource. Certainly, similar to the above-mentioned embodiments, the plurality of frequency domain resources on the same time domain resource may be continuous or discrete, or a part of them are continuous and other parts of them are discrete. The plurality of time domain resources on the same frequency domain resource may be continuous or discrete, or a part of them are continuous and other parts of them are discrete.

In some embodiments, one data can be carried on M precoding resource units for repeated transmission, and N precoding resource units in the M precoding resource units adopt the same precoding matrix; where M and N are both positive integers greater than or equal to 1; and M is greater than or equal to N. Carrying one data on the M precoding resource units for repeated transmission means that each of the M precoding resource units carries the same data, such that the data is repeatedly transmitted M times through the M precoding resource units. In some embodiments, one data may be carried on M precoding resource units for repeated transmission, and N precoding resource units in the M precoding resource units adopt different precoding matrices. In some embodiments, one data can be carried on M precoding resource units for repeated transmission, N precoding resource units in the M precoding resource units adopt different precoding matrices, and (M-N) remaining precoding resource units in the M precoding resource units adopt the same precoding matrix.

Here, repeated transmission can improve the coverage capability of the communication network. In some embodiments, the value of M can be configured based on situations of the signal coverage. For example, when the communication signal coverage is poor, a large value is set for M. When the signal coverage is good, a smaller value is set for M.

Here, setting a larger value for M can make the communication network have a stronger coverage capability.

In some embodiments, the data is divided into a plurality of sub-data, at least one sub-data in the plurality of sub-data is carried on the M precoding resource units for repeated transmission, and N precoding resource units in the M precoding resource units adopt the same precoding matrix or different precoding matrices; where M and N are both positive integers greater than or equal to 1; and M is greater than or equal to N. Carrying one sub-data on the M precoding resource units for repeated transmission means that each of the M precoding resource units carries the same sub-data, such that the sub-data is repeatedly transmitted M times through the M precoding resource units. In some embodiments, one sub-data may be carried on the M precoding resource units for repeated transmission, and N precoding resource units in the M precoding resource units adopt different precoding matrices. In some embodiments, one sub-data may be carried on M precoding resource units for repeated transmission, N precoding resource units in the M precoding resource units adopt different precoding matrices, and (M-N) remaining precoding resource units in the M precoding resource units adopt the same precoding matrix. In some embodiments, one of the plurality of sub-data is carried on the M precoding resource units for repeated transmission, and the other sub-data may be transmitted with the solution of any embodiment of the disclosure. It is understandable that other sub-data may adopt the same precoding matrix as the repeatedly transmitted sub-data, or may adopt different precoding matrices. The above-mentioned examples are described, and the embodiments of the disclosure are not limited to these examples.

In some embodiments, the data is divided into a plurality of sub-data, and the plurality of sub-data are carried on a corresponding number of precoding resource units. The precoding resource units adopt the same precoding matrix. In some embodiments, the data is divided into a plurality of sub-data, and the plurality of sub-data are carried on a corresponding number of precoding resource units. The precoding resource units adopt different precoding matrices. In some embodiments, the data is divided into a plurality of sub-data, and the plurality of sub-data are carried on a corresponding number of precoding resource units. Some of the precoding resource units adopt the same precoding matrix, and some of the precoding resource units adopt the same precoding matrix.

In some embodiments, the plurality of precoding resource units are a plurality of precoding time domain units, the plurality of precoding time domain units are one or more time domain resources on the same frequency domain resource, and the plurality of precoding time domain units adopt the same precoding matrix. In some embodiments, the plurality of precoding resource units are a plurality of precoding time domain units, the plurality of precoding time domain units are one or more time domain resources on different frequency domain resources, and the plurality of precoding time domain units adopt the same precoding matrix.

In some embodiments, different precoding time domain units adopt different precoding matrices to encode data.

In some embodiments, in the same frequency domain, at least a part of the different precoding time domain units adopt the same precoding matrix. In the same frequency domain, the different precoding time domain units adopt the same precoding matrix. Alternatively, in the same frequency domain, a continuously distributed part of the different precoding time domain units adopt the same precoding matrix.

In some embodiments, the plurality of precoding resource units are a plurality of precoding frequency domain units, the plurality of precoding frequency domain units are one or more frequency domain resources on the same time domain resource, and the plurality of precoding frequency domain units adopt the same precoding matrix. In some embodiments, the plurality of precoding resource units are a plurality of precoding frequency domain units, the plurality of precoding frequency domain units are one or more frequency domain resources on different time domain resources, and the plurality of precoding frequency domain units adopt the same precoding matrix.

In some embodiments, different precoding frequency domain units adopt different precoding matrices to encode data.

In some embodiments, in the same time domain, at least a part of the different precoding frequency domain units adopt the same precoding matrix to encode data. In the same time domain, the different precoding frequency domain units adopt the same precoding matrix to encode data. Alternatively, in the same time domain, a continuously distributed part of the different precoding frequency domain units adopt the same precoding matrix to encode data.

As illustrated in FIG. 9, another embodiment of the disclosure provides a data transmission method. The method includes the following.

At step 91, frequency domain resources and/or time domain resources included in a precoding resource unit are determined.

In some embodiments, the frequency domain resources and/or time domain resources included in the precoding resource unit are determined by a communication protocol. In some embodiments, the frequency domain resources and/or time domain resources included in the precoding resource unit are determined by the value of M, which can be seen from Table 1.

TABLE 1

| the value of M | the number of frequency domain resources and/or time domain resources included in the precoding resource units |
|---|---|
| M less than or equal to 4 | 1 |
| 4 < M < 17 | 2 |
| M > 16 | 4 |

Another embodiment of the disclosure provides a data transmission method. The method includes: determining a value of N. The value of N is determined by a communication protocol. That is, the value of N is configured according to a type of communication protocol used.

Alternatively, the method includes determining the value of N according to received signaling. For example, the value of N can be determined according to a value configured by high-layer signaling or a value configured by physical layer control signaling.

Alternatively, the method includes determining the value of N based on the value of M.

In some embodiments, the value of N may be specified by a communication protocol. In an example, a first communication protocol specifies that the value of N is 3, while a second communication protocol specifies that the value of N is 4. Here, when the sending end performs the communication based on a corresponding communication protocol, the value of N can be determined and configured.

In some embodiments, the high-layer signaling may be signaling from a radio resource control (RRC) layer or signaling from a media access control (MAC) layer, such as, RRC signaling or MAC signaling.

In some embodiments, as shown in Table 2, the value of N can be determined according to the value of M as follows.

TABLE 2

| the value of M | the value of N |
|---|---|
| M less than or equal to 4 | 1 |
| $4 < M < 17$ | 2 |
| $M > 16$ | 4 |

As illustrated in FIG. 10, another embodiment of the disclosure provides a data transmission method, performed by a receiving end. The method includes the following.

At step 101, data carried on a plurality of precoding resource units is received.

At step 102: frequency domain resources and/or time domain resources corresponding to each precoding resource unit are determined; or precoding resource units adopting the same precoding matrix to encode data are determined. A plurality of precoding resource units configured to carry data adopt the same or different precoding matrices. The plurality of precoding resource units include a plurality of precoding time domain units and/or a plurality of precoding frequency domain units.

In some embodiments, the receiving end may be a base station or a terminal.

In some embodiments, a sending end is a base station, and the receiving end is a terminal. The terminal can be a water meter, an electricity meter, an environmental monitoring sensor, an industrial wireless sensor, a wearable device, or the like.

In some embodiments, in sending the data to the receiving end, the sending end needs to perform precoding on the data to be transmitted by adopting a precoding matrix.

In some embodiments, both the base station and the terminal may know the precoding matrices in advance, and the base station or the terminal will select a precoding matrix that can maximize the channel matrix capacity to encode the data. Here, performing the precoding on the data is to multiply the data to be transmitted by the precoding matrix.

The precoding resource unit is the unit of the transmission resource, including: one or more physical resources. These one or more physical resources can be one or more time domain resources or one or more frequency domain resources. In some embodiments, the precoding resource unit may be a plurality of physical resources distributed in time domain and frequency domain.

The plurality of precoding resource units include a plurality of precoding time domain units and/or a plurality of precoding frequency domain units. That is, the plurality of precoding resource units may be a plurality of precoding time domain units, or a plurality of precoding frequency domain units, or a plurality of precoding frequency domain units and a plurality of precoding frequency domain units.

In some embodiments, the plurality of precoding time domain units are one or more time domain resources on the same frequency domain resource, and the plurality of precoding time domain units adopt the same precoding matrix.

Alternatively, the plurality of precoding time domain units are one or more time domain resources on different frequency domain resources, and the plurality of precoding time domain units adopt the same precoding matrix.

In some embodiments, the plurality of precoding frequency domain units are one or more frequency domain resources on the same time domain resource, and the plurality of precoding frequency domain units adopt the same precoding matrix.

Alternatively, the plurality of precoding frequency domain units are one or more frequency domain resources on different time domain resources, and the plurality of precoding frequency domain units adopt the same precoding matrix.

In embodiments of the disclosure, the time domain resource may be slot, symbol, subframe, or the like. The frequency domain resource may be physical resource block (PRB), resource element group (REG), REG bundle, or the like.

In some embodiments, the plurality of time domain resources may be one or more slots. The plurality of frequency domain resources may be one or more PRBs. Here, in the case that the precoding resource unit includes the plurality of time domain resources, the precoding resource unit may be a plurality of continuous time domain resources. For example, the precoding resource unit may be a plurality of slots, and these slots may be continuous. Alternatively, these slots are discontinuous, or some of them are continuous and other parts are discontinuous. In the case that the precoding frequency domain unit includes multiple frequency domain resources, the precoding resource unit may be a plurality of frequency domain resources. For example, the precoding resource unit may be a plurality of PRBs. These PRBs may be continuous or discontinuous, or some of them are continuous and other parts are discontinuous.

In some embodiments, in the case that the precoding resource unit includes the plurality of time domain resources, the precoding resource unit may be a plurality of discrete time domain resources. For example, the precoding resource unit may be a plurality of discrete slots. In the case that the precoding frequency domain unit includes a plurality of frequency domain resources, the precoding resource unit may be a plurality of discrete frequency domain resources. For example, a precoding resource unit may be a plurality of discrete PRBs.

In some embodiments, one data may be carried on one precoding resource unit, or may be divided into a plurality of sub-data and the plurality of sub-data are carried on the plurality of precoding resource units. For example, when the data includes first sub-data and second sub-data, the first sub-data may be carried on a first precoding resource unit, and the second sub-data may be carried on a second precoding resource unit.

In some embodiments, the precoding resource units are the precoding time domain units, and the precoding time domain units include a plurality of different time domain resources on the same frequency domain resource.

In some embodiments, as illustrated in FIG. 3 again, the frequency domain resource is a first frequency domain resource, and the time domain resources include a first time domain resource, a second time domain resource, a third time domain resource, and a fourth time domain resource. Therefore, the first precoding time domain unit may include the first time domain resource, the second time domain resource, the third time domain resource and the fourth time domain resource on the first frequency domain resource.

In some embodiments, how many different time domain resources the precoding time domain unit includes may be specified by a communication protocol, or determined by the network side and instructed by the terminal side, or negotiated by the network side and the terminal side, or reported by the terminal side to the network side, or determines based on preset rules. In some embodiments, a first communication protocol stipulates that the precoding time domain unit includes three different time domain resources on the same frequency domain resource, and a second communication protocol stipulates that the precoding time domain unit includes four different time domain resources on the same frequency domain resource. Here, when the sending end performs the communication based on a corresponding communication protocol, the number of time domain resources included in each precoding time domain unit can be determined.

In some embodiments, the precoding time domain unit includes a plurality of continuous time domain resources on the same frequency domain resource. In some embodiments, the precoding time domain unit includes a plurality of discrete time domain resources on the same frequency domain resource.

In some embodiments, the data carried on different precoding time domain units is encoded by adopting different precoding matrices.

In some embodiments, as illustrated in FIG. 4 again, there are a plurality of continuously distributed time domain resources on the first frequency domain resource. In the following, there are 6 time domain resources on one precoding frequency domain unit is taken as an example. In this case, on one precoding frequency domain unit, there includes: a first time domain resource, a second time domain resource, a third time domain resource, a fourth time domain resource, a fifth time domain resource and a sixth time domain resource. A first precoding time domain unit includes the first time domain resource and the second time domain resource, a second precoding time domain unit includes the third time domain resource and the fourth time domain resource, and a third precoding time domain unit includes the fifth time domain resource and the sixth time domain unit. The precoding matrices includes a first precoding matrix, a second precoding matrix and a third precoding matrix. In some embodiments, the data carried on the first precoding time domain unit is encoded by adopting the first precoding matrix, the data carried on the second precoding time domain unit is encoded by adopting the second precoding matrix, and the data carried on the third precoding time domain unit is encoded by adopting the third precoding matrix.

In some embodiments, the precoding resource units are the precoding frequency domain units, and the precoding frequency domain units include a plurality of different frequency domain resources on the same time domain resource.

In some embodiments, as illustrated in FIG. 5 again, the time domain resource is a first time domain resource, and the frequency domain resources include a first frequency domain resource, a second frequency domain resource, a third frequency domain resource and a fourth frequency domain resource. Therefore, the first coding frequency domain unit may include the first frequency domain resource, the second frequency domain resource, the third frequency domain resource and the fourth frequency domain resource on the first time domain resource.

In some embodiments, how many different frequency domain resources the precoding frequency domain unit includes may be specified by a communication protocol. In some embodiments, a first communication protocol specifies that the precoding frequency domain unit includes three different frequency domain resources on the same time domain resource, and a second communication protocol specifies that the precoding frequency domain unit includes four different frequency domain resources on the same time domain resource. Here, when the sending end performs the communication based on a corresponding communication protocol, the number of frequency domain resources included in each precoding frequency domain unit can be determined.

In some embodiments, the precoding frequency domain unit includes a plurality of continuous frequency domain resources on the same time domain resource. In some embodiments, the precoding frequency domain unit includes a plurality of discrete frequency domain resources on the same time domain resource.

In some embodiments, the data carried on different precoding frequency domain units is encoded by adopting different precoding matrices.

In some embodiments, as illustrated in FIG. 6 again, there are continuously distributed first frequency domain resource, second frequency domain resource, third frequency domain resource, fourth frequency domain resource, fifth frequency domain resources resource and sixth frequency domain resource on the first time domain resource. The first precoding frequency domain unit includes the first frequency domain resource and the second frequency domain resource, the second precoding frequency domain unit includes the third frequency domain resource and the fourth frequency domain resource, and the third precoding frequency domain unit includes the fifth frequency domain resources and the sixth frequency domain resources. The precoding matrices include a first precoding matrix, a second precoding matrix and a third precoding matrix. In some embodiments, the data carried on the first precoding frequency domain unit is encoded by adopting the first precoding matrix, the data carried on the second precoding frequency domain unit is encoded by adopting the second precoding matrix, and the data carried on the third precoding frequency domain unit is encoded by adopting the third precoding matrix.

Alternatively, in the same time domain, the data carried on at least a part of the different precoding frequency domain units is encoded by adopting the same precoding matrix.

In some embodiments, as illustrated in FIG. 7 again, there are continuously distributed first frequency domain resource, second frequency domain resource, third frequency domain resource, fourth frequency domain resource, fifth frequency domain resources resource and sixth frequency domain resource on the first time domain resource. The first precoding frequency domain unit includes the first frequency domain resource and the second frequency domain resource, the second precoding frequency domain unit includes the third frequency domain resource and the fourth frequency domain resource, and the third precoding frequency domain unit includes the fifth frequency domain resource and the sixth frequency domain resource. In some embodiments, at least two of the first precoding frequency domain unit, the second precoding frequency domain unit and the third precoding frequency domain unit adopt the same precoding matrix. For example, the first precoding frequency domain unit and the second precoding frequency domain unit adopt a first precoding matrix, and the third precoding frequency domain unit adopts the second precoding matrix.

In some embodiments, in the same time domain, encoding the data carried on at least a part of the different precoding frequency domain units adopting the same precoding matrix includes in the same time domain, encoding the data carried on all of the different precoding frequency domain units by adopting the same precoding matrix.

In some embodiments, as illustrated in FIG. 8 again, there are a first precoding frequency domain unit, a second precoding frequency domain unit, a third precoding frequency domain unit, and a fourth precoding frequency domain unit on a first time domain resource. There are a fifth precoding unit, a sixth precoding unit, a seventh precoding unit and an eighth precoding unit on a second time domain resource. The data carried on the first precoding frequency domain unit, the second precoding frequency domain unit, the third precoding frequency domain unit, and the fourth precoding frequency domain unit on the first time domain resource is encoded by adopting a first precoding matrix. The data carried on the fifth precoding unit, the sixth precoding unit, the seventh precoding unit, and the eighth precoding unit on the second time domain resource is encoded by adopting a second precoding matrix.

Alternatively, in the same time domain, the data carried on a consecutively distributed part of the different precoding frequency domain units is encoded by adopting the same precoding matrix.

In some embodiments, as illustrated in FIG. 8 again, on the first time domain resource, the data carried on the first precoding frequency domain unit and the second precoding frequency domain unit is encoded by adopting a first coding matrix, and the data carried on the third precoding frequency domain unit and the fourth precoding frequency domain unit is encoded by adopting a second precoding matrix. On the second time domain resource, the data carried on the fifth precoding frequency domain unit and the sixth precoding frequency domain unit is encoded by adopting a third coding matrix, and the data carried on the seventh precoding frequency domain unit and the eighth precoding frequency domain unit is encoded by adopting a fourth precoding matrix.

In some embodiments, the precoding resource units are precoding time domain units and precoding frequency domain units. That is, the precoding resource units are a plurality of different time domain resources on a plurality of different frequency domain resources. In other words, among the precoding resource units, a part of the precoding resource units are a plurality of frequency domain resources on the same time domain resource, and another part of the precoding resource units are a plurality of time domain resources on the same frequency domain resource. Certainly, similar to the above-mentioned embodiments, the plurality of frequency domain resources on the same time domain resource may be continuous or discrete, or a part of them are continuous and other parts of them are discrete. The plurality of time domain resources on the same frequency domain resource may be continuous or discrete, or a part of them are continuous and other parts of them are discrete.

In some embodiments, one data can be carried on M precoding resource units for repeated transmission, and N precoding resource units in the M precoding resource units adopt the same precoding matrix; where M and N are both positive integers greater than or equal to 1; and M is greater than or equal to N. Carrying one data on the M precoding resource units for repeated transmission means that each of the M precoding resource units carries the same data, such that the data is repeatedly transmitted M times through the M precoding resource units. In some embodiments, one data may be carried on M precoding resource units for repeated transmission, and N precoding resource units in the M precoding resource units adopt different precoding matrices. In some embodiments, one data can be carried on M precoding resource units for repeated transmission, N precoding resource units in the M precoding resource units adopt different precoding matrices, and (M-N) remaining precoding resource units in the M precoding resource units adopt the same precoding matrix.

Here, repeated transmission can improve the coverage capability of the communication network. In some embodiments, the value of M can be configured based on situations of the signal coverage. For example, when the communication signal coverage is poor, a large value is set for M. When the signal coverage is good, a smaller value is set for M. Here, setting a larger value for M can make the communication network have a stronger coverage capability.

In some embodiments, the data is divided into a plurality of sub-data, at least one sub-data in the plurality of sub-data is carried on the M precoding resource units for repeated transmission, and N precoding resource units in the M precoding resource units adopt the same precoding matrix or different precoding matrices; where M and N are both positive integers greater than or equal to 1; and M is greater than or equal to N. Carrying one sub-data on the M precoding resource units for repeated transmission means that each of the M precoding resource units carries the same sub-data, such that the sub-data is repeatedly transmitted M times through the M precoding resource units. In some embodiments, one sub-data may be carried on the M precoding resource units for repeated transmission, and N precoding resource units in the M precoding resource units adopt different precoding matrices. In some embodiments, one sub-data may be carried on M precoding resource units for repeated transmission, N precoding resource units in the M precoding resource units adopt different precoding matrices, and (M-N) remaining precoding resource units in the M precoding resource units adopt the same precoding matrix. In some embodiments, one of the plurality of sub-data is carried on the M precoding resource units for repeated transmission, and the other sub-data may be transmitted with the solution of any embodiment of the disclosure. It is understandable that other sub-data may adopt the same precoding matrix as the repeatedly transmitted sub-data, or may adopt different precoding matrices. The above-mentioned examples are described, and the embodiments of the disclosure are not limited to these examples.

In some embodiments, the data is divided into a plurality of sub-data, and the plurality of sub-data are carried on a corresponding number of precoding resource units. The precoding resource units adopt the same precoding matrix. In some embodiments, the data is divided into a plurality of sub-data, and the plurality of sub-data are carried on a corresponding number of precoding resource units. The precoding resource units adopt different precoding matrices. In some embodiments, the data is divided into a plurality of sub-data, and the plurality of sub-data are carried on a corresponding number of precoding resource units. Some of the precoding resource units adopt the same precoding matrix, and some of the precoding resource units adopt the same precoding matrix.

In some embodiments, the plurality of precoding resource units are a plurality of precoding time domain units, the plurality of precoding time domain units are one or more time domain resources on the same frequency domain resource, and the plurality of precoding time domain units adopt the same precoding matrix. In some embodiments, the plurality of precoding resource units are a plurality of precoding time domain units, the plurality of precoding time domain units are one or more time domain resources on different frequency domain resources, and the plurality of precoding time domain units adopt the same precoding matrix.

In some embodiments, different precoding time domain units adopt different precoding matrices to encode data.

In some embodiments, in the same frequency domain, at least a part of the different precoding time domain units adopt the same precoding matrix. In the same frequency domain, the different precoding time domain units adopt the same precoding matrix. Alternatively, in the same frequency domain, a continuously distributed part of the different precoding time domain units adopt the same precoding matrix.

In some embodiments, when the receiving end receives the precoding time domain units, and the data carried on the different precoding time domain units is encoded by adopting different precoding matrices, the data carried on the different precoding time domain units is processed separately. In some embodiments, when in the same frequency domain, the data carried on at least a part of the different precoding time domain units is encoded by adopting the same precoding matrix, the data carried on the part of the different precoding time domain units that adopt the same precoding matrix is integrally processed. In some embodiments, different precoding time domain units are processed separately. That is, regardless of whether the adopted precoding matrices are the same, the data carried on the precoding time domain units is processed separately. Here, separately processing include separately using the reference signal in an processed object to perform the channel estimation and/or separately performing data demodulation and/or separately performing channel decoding of data. Here, the processed object may be the precoding time domain unit or the precoding frequency domain unit.

In some embodiments, when the receiving end receives the precoding time domain units, the data carried on all of the different precoding time domain units are integrally processed. In some embodiments, the data carried on a continuously distributed part of the different precoding time domain units is integrally processed. Here, integrally processing may include jointly using the reference signals in the processed object to perform channel estimation and/or jointly demodulating the data in the processed object and/or performing joint channel decoding on the data in the processed object. Here, the processed object may be the precoding time domain unit or the precoding frequency domain unit.

In some embodiments, the plurality of precoding resource units are a plurality of precoding frequency domain units, the plurality of precoding frequency domain units are one or more frequency domain resources on the same time domain resource, and the plurality of precoding frequency domain units adopt the same precoding matrix. In some embodiments, the plurality of precoding resource units are a plurality of precoding frequency domain units, the plurality of precoding frequency domain units are one or more frequency domain resources on different time domain resources, and the plurality of precoding frequency domain units adopt the same precoding matrix.

In some embodiments, different precoding frequency domain units adopt different precoding matrices to encode data.

In some embodiments, in the same time domain, at least a part of the different precoding frequency domain units adopt the same precoding matrix to encode data. In the same time domain, the different precoding frequency domain units adopt the same precoding matrix to encode data. Alternatively, in the same time domain, a continuously distributed part of the different precoding frequency domain units adopt the same precoding matrix to encode data.

In some embodiments, when the precoding frequency domain units are received and the data carried on the different precoding frequency domain units is encoded by adopting different precoding matrices, the data carried on different precoding frequency domain units is processed separately. In some embodiments, when the precoding frequency domain units are received, and in the same time domain, the data carried on at least a part of the different precoding frequency domain units is encoded by adopting the same precoding matrix, the receiving end integrally processes the data carried on the part of the different precoding frequency domain units that adopt the same precoding matrix. In some embodiments, the data carried on the different precoding frequency domain units is processed separately. That is, regardless of whether the used precoding matrices are the same, the data carried on the precoding time domain units is processed separately.

In some embodiments, when receiving the precoding frequency domain units, the data carried on all of the different precoding frequency domain units are integrally processed. In some embodiments, when the precoding frequency domain units are received, the data carried on a consecutively distributed part of the different precoding frequency domain units that adopt the same precoding matrix is integrally processed.

As illustrated in FIG. 11, an embodiment of the disclosure provides a data transmission apparatus. The apparatus includes a first determining module 111 and a carrying module 112.

The first determining module 111 is configured to determine data to be transmitted.

The carrying module 112 is configured to carry the data on a plurality of precoding resource units. The plurality of precoding resource units configured to carry data adopt the same or different precoding matrices. The plurality of precoding resource units include a plurality of precoding time domain units and/or a plurality of precoding frequency domain units.

In some embodiments, the data is carried on M precoding resource units for repeated transmission, and N precoding resource units in the M precoding resource units adopt the same precoding matrix or different precoding matrices; where M and N are positive integers greater than or equal to 1; and M is greater than or equal to N.

In some embodiments, the carrying module 112 is further configured to divide the data into a plurality of sub-data, and carry at least one sub-data in the plurality of sub-data on the M precoding resource units for repeated transmission. N precoding resource units in the M precoding resource units adopt the same precoding matrix or different precoding matrices; where M and N are both positive integers greater than or equal to 1; and M is greater than or equal to N.

In some embodiments, the data is a plurality of sub-data, and the carrying module 112 is further configured to carry the plurality of sub-data on a corresponding number of precoding resource units. The precoding resource units adopt the same precoding matrix or different precoding matrices.

In some embodiments, the plurality of precoding resource units are the plurality of precoding time domain units, the plurality of precoding time domain units are one or more time domains on the same frequency domain resource, and the plurality of precoding time domain units adopt the same precoding matrix.

In some embodiments, the plurality of precoding resource units are a plurality of precoding time domain units, the plurality of precoding time domain units are one or more time domains on the same frequency domain resource, and the plurality of precoding time domain units adopt the same precoding matrix.

In some embodiments, different precoding time domain units adopt different precoding matrices to encode data. In some embodiments, in the same frequency domain, at least a part of the different precoding time domain units adopt the same precoding matrix.

In some embodiments, in the same time domain, adopting the same precoding matrix by at least a part of the different precoding time domain units includes: in the same frequency domain, adopting the same precoding matrix by the different precoding time domain units; or, in the same frequency domain, adopting the same precoding matrix by a consecutively distributed part of the different precoding time domain units.

In some embodiments, the plurality of precoding resource units are a plurality of precoding frequency domain units, the plurality of precoding frequency domain units are one or more frequency domain resources on the same time resource, and the plurality of precoding frequency domain units adopt the same precoding matrix.

In some embodiments, the plurality of precoding resource units are a plurality of precoding frequency domain units, the plurality of precoding frequency domain units are one or more frequency domain resources on the same time resource, and the plurality of precoding frequency domain units adopt the same precoding matrix.

In some embodiments, different precoding frequency domain units adopt different precoding matrices to encode data. In some embodiments, in the same time domain, at least a part of the different precoding frequency domain units adopt the same precoding matrix to encode data.

In some embodiments, in the same time domain, adopting the same precoding matrix by at least a part of the different precoding frequency domain units includes in the same time domain, adopting the same precoding matrix by different precoding frequency domain units; or in the same time domain, encoding the data carried on a continuously distributed part of the different precoding frequency domain units by adopting the same precoding matrix.

In some embodiments, the carrying module 112 is configured to determine frequency domain resources and/or time domain resources included in the precoding resource units.

The frequency domain resources and/or the time domain resources included in the precoding resource units are determined according to a communication protocol.

Alternatively, the frequency domain resources and/or the time domain resources included in the precoding resource units are determined according to the number of times M of repeatedly transmitting the data.

Figures 12, 13:
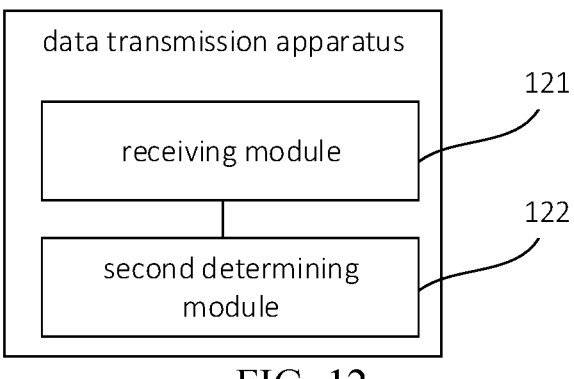
FIG. 12 is a schematic diagram illustrating a data transmission apparatus in accordance with another embodiment of the disclosure.
FIG. 13 is a block diagram illustrating a terminal in accordance with another embodiment of the disclosure.

As illustrated in FIG. 12, another embodiment of the disclosure provides a data transmission apparatus. The apparatus includes a receiving module 121 and a second determining module 122.

The receiving module 121 is configured to receive data carried on a plurality of precoding resource units.

The second determining module 122 is configured to determine a frequency domain resource and/or a time domain resource corresponding to each precoding resource unit, or determine precoding resource units adopting the same precoding matrix to encode data. A plurality of precoding resource units configured to carry data adopt the same or different precoding matrices. The plurality of precoding resource units include a plurality of precoding time domain units and/or a plurality of precoding frequency domain units.

In some embodiments, the data is carried on M precoding resource units for repeated transmission, and N precoding resource units in the M precoding resource units adopt the same precoding matrix or different precoding matrices; where M and N are positive integers greater than or equal to 1; and M is greater than or equal to N.

In some embodiments, the data includes a plurality of sub-data, at least one of the plurality of sub-data is carried on the M precoding resource units for repeated transmission, and N precoding resources in the M precoding resource units adopt the same precoding matrix or different precoding matrices; where M and N are both positive integers greater than or equal to 1; and M is greater than or equal to N.

In some embodiments, the data includes a plurality of sub-data, the plurality of sub-data are carried on a corresponding number of precoding resource units, and the precoding resource units adopt the same precoding matrix or different precoding matrices.

In some embodiments, the plurality of precoding resource units are a plurality of precoding time domain units, the plurality of precoding time domain units are one or more time domain resources on the same frequency domain resource, and the plurality of precoding time domain units adopt the same precoding matrix.

In some embodiments, the plurality of precoding resource units are a plurality of precoding time domain units, the plurality of precoding time domain units are one or more time domain resources on different frequency domain resources, and the plurality of precoding time domain units adopt the same precoding matrix.

In some embodiments, different precoding frequency domain units adopt different precoding matrices to encode data. In some embodiments, in the same time domain, at least a part of the different precoding frequency domain units adopt the same precoding matrix to encode data.

In some embodiments, in the same time domain, adopting the same precoding matrix by at least a part of the different precoding frequency domain units includes in the same time domain, adopting the same precoding matrix by different precoding frequency domain units, or in the same time domain, encoding the data carried on a continuously distributed part of the different precoding frequency domain units by adopting the same precoding matrix.

In some embodiments, when the data carried on different precoding time-domain units is encoded by adopting different precoding matrices, the data carried on the different precoding time domain units is processed separately;

Alternatively, in the same frequency domain, when the data carried on at least a part of the different precoding time domain units is encoded by adopting the same precoding matrix, the data carried on the part of the different precoding frequency domain units is integrally processed.

Alternatively, the different precoding time domain units are processed separately.

In some embodiments, the second determining module 122 is configured to integrally process the data carried on all of the different precoding time domain units.

Alternatively, the second determining module 122 is configured to integrally process the data carried on a continuously distribute part of the different precoding time domain units that adopt the same precoding matrix.

In some embodiments, the plurality of precoding resource units are a plurality of precoding frequency domain units, the plurality of precoding frequency domain units are one or more frequency domain resources on the same time domain resource, and the plurality of precoding frequency domain units adopt the same precoding matrix.

In some embodiments, the plurality of precoding resource units are a plurality of precoding frequency domain units, the plurality of precoding frequency domain units are one or more frequency domain resources on different time domain resources, and the plurality of precoding frequency domain units adopt the same precoding matrix.

In some embodiments, the different precoding frequency domain units adopt different precoding matrices to encode data. In some embodiments, in the same time domain, at least a part of the different precoding frequency domain units adopt the same precoding matrix to encode data.

In some embodiments, in the same time domain, adopting the same precoding matrix by at least a part of the different precoding frequency domain units includes in the same time domain, adopting the same precoding matrix by the different precoding frequency domain units, or in the same time domain, encoding the data carried on the continuously distributed part of the different precoding frequency domain units by adopting the same precoding matrix.

In some embodiments, the second determining module 122 is configured to when the data carried on the different precoding frequency domain units is encoded by adopting different precoding matrices, separately process the data carried on the different precoding frequency domain units.

Alternatively, the second determining module 122 is configured to: in the same time domain, when the data carried by at least a part of the different precoding frequency domain units is encoded by adopting the same precoding matrix, integrally processing the data carried on the part of the different precoding frequency domain units that adopt the same precoding matrix.

In some embodiments, the second determining module 122 is configured to determine frequency domain resources and/or time domain resources included in the precoding resource units.

The frequency domain resources and/or the time domain resources included in the precoding resource units are determined according to a communication protocol.

Alternatively, the frequency domain resources and/or the time domain resources included in the precoding resource units are determined according to the number of times M of repeatedly transmitting the data.

In some embodiments, the second determining module 122 is configured to when the data carried on the different precoding frequency domain units is encoded by adopting different precoding matrices, separately process the data carried on the different precoding frequency domain units.

Alternatively, the second determining module 122 is configured to: in the same time domain, when the data carried by at least a part of the different precoding frequency domain units is encoded by adopting the same precoding matrix, integrally process the data carried on the part of the different precoding frequency domain units that adopt the same precoding matrix.

Alternatively, the second determining module 122 is configured to separately process the data carried on the different precoding frequency domain units.

In some embodiments, the second determining module 122 is configured to integrally process the data carried on all of the different precoding frequency domain units.

Alternatively, the second determining module 122 is configured to integrally process the data carried on a continuously distributed part of the different precoding frequency domain units that adopt the same precoding matrix.

In some embodiments, M is a positive integer times of N.

In some embodiments, the second determining module 122 is configured to integrally process the precoding resource units that adopt the same precoding matrix.

In some embodiments, the second determining module 122 is configured to separately process the precoding resource units that adopt different precoding matrices.

Embodiments of the disclosure further provide a communication device. The communication device includes an antenna, a memory, and a processor. The processor is connected to the antenna and the memory respectively, and is configured to control the antenna to send and receive radio signals by executing an executable program stored in the memory to perform steps of the data transmission method according to any of the foregoing embodiments.

The communication device according to embodiments may be the aforementioned terminal or base station. The terminal may be various human-carried terminals or vehicle-mounted terminals. The base station may be various types of base stations, such as a 4G base station or a 5G base station.

The antennas may be various types of antennas, such as mobile antennas e.g., 3G antennas, 4G antennas, or 5G antennas. The antennas can also include: WiFi antennas, wireless charging antennas, and the like.

The memory may include various types of storage media, which are non-transitory computer storage media that can continue to memorize the information stored thereon after the communication device is powered off.

The processor may be connected to the antenna and the memory through a bus or the like, and is configured to read an executable program stored in the memory, to perform at least one of the methods according to any of embodiments of the disclosure.

Embodiments of the disclosure further provide a non-transitory computer-readable storage medium. The non-transitory computer-readable storage medium has an executable program stored thereon. When the executable program is executed by a processor, steps of the data transmission method according to any of the foregoing embodiments are implemented. For example, at least one of the methods according any of the embodiments of the disclosure is performed.

As illustrated in FIG. 13, an embodiment of the disclosure provides a terminal. FIG. 13 is a block diagram illustrating a terminal 800 in accordance with an embodiment of the disclosure. The TERMINAL 800 may be a mobile phone, a computer, a digital broadcast terminal, a messaging device, a game console, a tablet device, a medical device, a fitness device, a personal digital assistant, and the like.

As illustrated in FIG. 13, the terminal 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operation of the terminal 800, such as operations associated with display, phone calls, data communications, camera operations, and recording operations. The processing component 802 can include one or more processors 820 to execute instructions to perform all or some of the steps of the methods described above. Additionally, the processing component 802 may include one or more modules that facilitate the interaction between processing component 802 and other components. For example, the processing component 802 may include a multimedia module to facilitate the interaction between the multimedia component 808 and the processing component 802.

The memory 804 is configured to store various types of data to support operations of the terminal 800. Examples of such data include instructions for operating any application or method on the terminal 800, contact data, phonebook data, messages, pictures, videos, and the like. The memory 804 may be implemented by any type of volatile or non-volatile storage device or a combination thereof, such as static random access memory (SRAM), electrically erasable programmable read only memory (EEPROM), erasable programmable read only memory (EPROM), programmable read-only memory (PROM), read only memory (ROM), magnetic memory, flash memory, magnetic disk or optical disk.

The power supply component 806 provides power to various components of the terminal 800. The power supply component 806 may include a power management system, one or more power supplies, and other components associated with generating, managing, and distributing power to the terminal 800.

The multimedia component 808 includes a screen that provides an output interface between the terminal 800 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensor can sense not only the boundaries of a touch or swipe action, but also the duration and pressure associated with the touch or swipe action. In some embodiments, the multimedia component 808 includes a front-facing camera and/or a rear-facing camera. When the terminal 800 is in an operation mode, such as a shooting mode or a video mode, the front-facing camera and/or the rear-facing camera may receive external multimedia data. Each of the front-facing and rear-facing cameras can be a fixed optical lens system or have focal length and optical zoom capability.

The audio component 810 is configured to output and/or input audio signals. For example, the audio component 810 includes a microphone (MIC) that is configured to receive external audio signals when the terminal 800 is in operating modes, such as call mode, recording mode, and voice recognition mode. The microphone is configured to receive external audio signals. The received audio signal may be further stored in the memory 804 or transmitted via the communication component 816. In some embodiments, the audio component 810 also includes a speaker for outputting the audio signals.

The I/O interface 812 is configured to provide an interface between the processing component 802 and a peripheral interface module. The peripheral interface module may be a keyboard, a click wheel, a button, and the like. These buttons may include, but are not limited to, home button, volume buttons, start button, and lock button.

The sensor component 814 includes one or more sensors for providing status assessment of various aspects of the terminal 800. For example, the sensor component 814 can detect the on/off state of the terminal 800, the relative positioning of components, such as the display and keypad of the terminal 800. The sensor component 814 can also detect a change in the position of the terminal 800 or a component of the terminal 800, the presence or absence of contact with the terminal 800, the orientation or acceleration/deceleration of the terminal 800 and the temperature change of the terminal 800. The sensor component 814 may include a proximity sensor configured to detect the presence of nearby objects in the absence of any physical contact. The sensor component 814 may also include a light sensor, such as a complementary metal oxide semiconductor (CMOS) or charge-coupled device (CCD) image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the terminal 800 and other devices. The terminal 800 may access a wireless network based on a communication standard, such as Wi-Fi, 2G or 3G, or a combination thereof. In some examples, the communication component 816 receives broadcast signals or broadcast related information from an external broadcast management system via a broadcast channel. In some examples, the communication component 816 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In some examples, the terminal 800 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component implementation for performing the above method.

In some embodiments, there is also provided a non-transitory computer-readable storage medium including instructions, such as a memory 904 including instructions. The instructions are executable by the processor 820 of the terminal 800 to perform the above method. For example, the non-transitory computer-readable storage medium may be ROM, random access memory (RAM), CD-ROM, magnetic tape, floppy disk, optical data storage device, and the like.

The terminal is configured to perform the above-mentioned method, for example the method according to any of embodiments of the disclosure.

Figure 14:
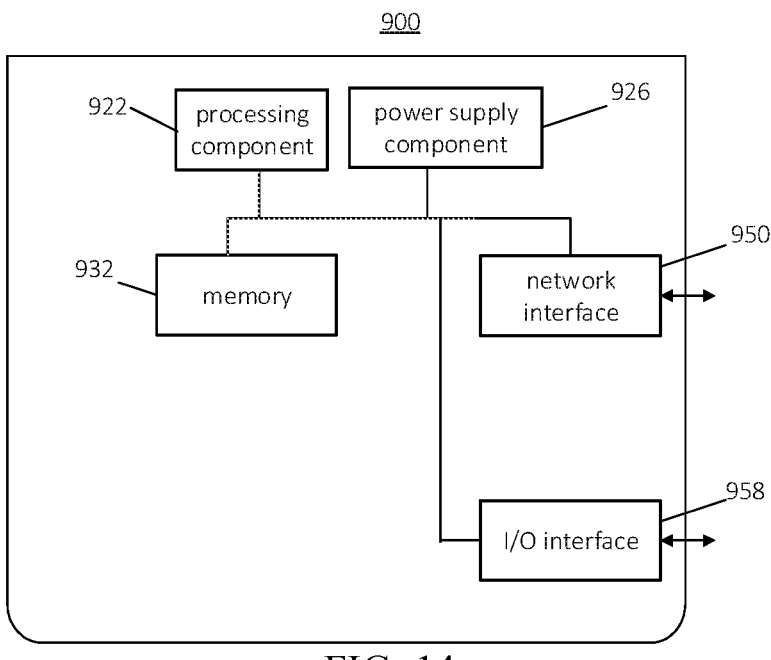
FIG. 14 is a block diagram illustrating a base station in accordance with another embodiment of the disclosure.

FIG. 14 is a block diagram illustrating a base station in accordance with an embodiment of the disclosure. For example, the base station 900 may be a network side device. As illustrated in FIG. 14, the base station 900 includes a processing component 922 and memory resources represented by the memory 932 for storing instruction. The processing component 922 further includes one or more processor. The instructions may be application programs and can be executed by the processing component 922. The application program stored in the memory 932 may include one or more modules, each corresponding to a set of instructions. Further, the processing component 922 is configured to execute the instructions to perform the foregoing method, such as the method according to any of embodiments of the disclosure.

The base station 900 further includes a power component 926 configured to perform power management of the base station 900, a wired or wireless network interface 950 configured to connect the base station 900 to the network, and an input/output (I/O) interface 958. The base station 900 may operate an operating system based on the memory, such as Windows Server™, Mac OS X™, Unix™, Linux™, FreeBSD™, or the like.

The wireless network interface 950 includes, but is not limited to, the antenna of the aforementioned communication device. Other implementations of the disclosure will be readily got by those skilled in the art upon consideration of the specification and practice of the disclosure. This disclosure is intended to cover any variations, uses, or adaptations of embodiments that follow the general principles of the embodiments and include those common design and conventional technical means that are not disclosed herein. The specification and examples are to be regarded as examples only, with the true scope and spirit of embodiments of the disclosure being indicated by the following claims.

It is understandable that the embodiments of the disclosure are not limited to the precise structures described above and illustrated in the accompanying drawings and that various modifications and changes may be made without departing from the scope thereof. The scope of embodiments of the disclosure is limited only by the appended claims.

What is claimed is:

1. A data transmission method, comprising:

determining data to be transmitted;

carrying the data on a plurality of precoding resource units that adopt a same precoding matrix or different precoding matrices, and wherein the plurality of precoding resource units comprise one or both of a plurality of precoding time domain units or a plurality of precoding frequency domain units;

wherein the data are carried on M precoding resource units for repeated transmission, and N precoding resource units in the M precoding resource units adopt the same precoding matrix or adopt different precoding matrices; where both M and N are positive integers greater than or equal to 1; and M is greater than or equal to N;

wherein consecutive first precoding frequency domain units in a first time domain resource adopt a first precoding matrix, and consecutive second precoding frequency domain units in a second time domain resource adjacent to the first time domain resource adopt a second precoding matrix different from the first precoding matrix.

2. The method of claim 1, wherein carrying the data on the plurality of precoding resource units comprises:

dividing the data into a plurality of sub-data, and carrying at least one of the plurality of sub-data on the M precoding resource units for repeated transmission, wherein the N precoding resource units in the M precoding resource units adopt the same precoding matrix or different precoding matrices; or carrying a plurality of sub-data of the data on a corresponding number of precoding resource units; wherein, the plurality of precoding resource units adopt the same precoding matrix or different precoding matrices.

3. The method of claim 1, wherein the plurality of precoding resource units are a plurality of precoding time domain units, the plurality of precoding time domain units are one or more time domain resources on the same frequency domain resource, and the plurality of precoding time domain units adopt the same precoding matrix;

or, the plurality of precoding resource units are a plurality of precoding time domain units, the plurality of precoding time domain units are one or more time domain resources on different frequency domain resources, and the plurality of precoding time domain units adopt the same precoding matrix.

4. The method of claim 3, wherein in the same frequency domain, at least a part of different precoding time domain units adopt the same precoding matrix.

5. The method of claim 4, wherein in the same frequency domain, adopting the same precoding matrix by at least a part of the different precoding time domain units comprises:

in the same frequency domain, adopting the same precoding matrix by the different precoding time domain units;

or, in the same frequency domain, adopting the same precoding matrix by a continuously distributed part of the different precoding time domain units.

6. The method of claim 1, wherein the plurality of precoding resource units are a plurality of precoding frequency domain units, the plurality of precoding frequency domain units are one or more frequency domain resources on the same time domain resource, and the plurality of precoding frequency domain units adopt the same precoding matrix;

or, the plurality of precoding resource units are a plurality of precoding frequency domain units, the plurality of precoding frequency domain units are one or more frequency domain resources on different time domain resources, and the plurality of precoding frequency domain units adopt the same precoding matrix.

7. The method of claim 6, wherein different precoding frequency domain units adopt different precoding matrices for encoding;

or, in the same time domain, at least a part of the different precoding frequency domain units adopt the same precoding matrix for encoding.

8. The method of claim 7, wherein in the same time domain, adopting the same precoding matrix by at least a part of the different precoding frequency domain units comprises:

in the same time domain, adopting the same precoding matrix by the different precoding frequency domain units for encoding;

or, in the same time domain, encoding data carried on a continuously distributed part of the different precoding frequency domain units by adopting the same precoding matrix.

9. The method of claim 1, further comprising:

determining frequency domain resources, time domain resources, or the frequency domain resources and the time domain resources comprised in the precoding resource units;

wherein, the frequency domain resources, the time domain resources, or the frequency domain resources and the time domain resources comprised in the precoding resource units are determined based on a communication protocol;

or, the frequency domain resources, the time domain resources, or the frequency domain resources and the time domain resources comprised in the precoding resource units are determined based on a number of times M of repeatedly transmitting the data.

10. The method of claim 1, wherein carrying the data on the plurality of precoding resource units comprises:

dividing the data into first sub-data and other sub-data, carrying the first sub-data on the M precoding resource units for repeated transmission and carrying the other sub-data on remaining precoding resource units of the plurality of precoding resource units.

11. A data transmission method, comprising:

receiving data carried on a plurality of precoding resource units;

determining one or both of a frequency domain resource or a time domain resource corresponding to each precoding resource unit; or determining precoding resource units adopting the same precoding matrix for encoding; wherein the plurality of precoding resource units configured to carry the data adopt the same precoding matrix or different precoding matrices;

and the plurality of precoding resource units comprise one or both of a plurality of precoding time domain units or a plurality of precoding frequency domain units;

wherein the data is carried on M precoding resource units for repeated transmission, and N precoding resource units in the M precoding resource units adopt the same precoding matrix or different precoding matrices; where M and the N are positive integers greater than or equal to 1; and M is greater than or equal to N;

wherein consecutive first precoding frequency domain units in a first time domain resource adopt a first precoding matrix, and consecutive second precoding frequency domain units in a second time domain resource adjacent to the first time domain resource adopt a second precoding matrix different from the first precoding matrix.

12. The method of claim 11, wherein the data comprises a plurality of sub-data, and at least one of the plurality of sub-data is carried on the M precoding resource units for repeated transmission; or the data comprises a plurality of sub-data, the plurality of sub-data are carried on a corresponding number of precoding resource units; and the precoding resource units adopt the same precoding matrix or different precoding matrices.

13. The method of claim 11, wherein the plurality of precoding resource units are a plurality of precoding time domain units, the plurality of precoding time domain units are one or more time domain resources on the same frequency domain resource, and the plurality of precoding time domain units adopt the same precoding matrix;

or, the plurality of precoding resource units are a plurality of precoding time domain units, the plurality of precoding time domain units are one or more time domain resources on different frequency domain resources, and the plurality of precoding time domain units adopt the same precoding matrix.

14. The method of claim 13, wherein different precoding frequency domain units adopt different precoding matrices for encoding;

or, in the same time domain, at least a part of the different precoding frequency domain units adopt the same precoding matrix for encoding.

15. The method of claim 14, wherein in response to determining that data carried on the different precoding time domain units is encoded by adopting different precoding matrices, separately processing the data carried on the different precoding time domain units;

or, in the same frequency domain, in response to determining that the data carried on at least a part of the different precoding time domain units is encoded by adopting the same precoding matrix, integrally processing the data carried on the part of the different precoding frequency domain units adopting the same precoding matrix;

or separately processing the different precoding time domain units.

16. The method of claim 11, wherein the plurality of precoding resource units are a plurality of precoding frequency domain units, the plurality of precoding frequency domain units are one or more frequency domain resources on the same time domain resource, and the plurality of precoding frequency domain units adopt the same precoding matrix;

or, the plurality of precoding resource units are a plurality of precoding frequency domain units, the plurality of precoding frequency domain units are one or more frequency domain resources on different time domain resources, and the plurality of precoding frequency domain units adopt the same precoding matrix.

17. The method of claim 16, further comprising:

in response to determining that data carried on the different precoding frequency domain units is encoded by adopting different precoding matrices, separately processing the data carried on the different precoding frequency domain units;

or, in the same time domain, in response to determining that data carried on at least a part of the different precoding frequency domain units is encoded by adopting the same precoding matrix, integrally processing the data carried on the part of the different precoding frequency domain units adopting the same precoding matrix.

18. The method of claim 17, further comprising:

in response to determining that data carried on the different precoding frequency domain units is encoded by adopting different precoding matrices, separately processing the data carried on the different precoding frequency domain units;

or, in the same time domain, in response to determining that data carried by at least a part of the different precoding frequency domain units is encoded by adopting the same precoding matrix, integrally processing the data carried on the part of the different precoding frequency domain units adopting the same precoding matrix;

or, separately processing the data carried on the different precoding frequency domain units.

19. A communication device, comprising:

an antenna;

a memory; and a processor, connected to the antenna and the memory respectively, configured to control the antenna to send and receive radio signals by executing an executable program stored on the memory, and capable of determining data to be transmitted; and carrying the data on a plurality of precoding resource units that adopt a same precoding matrix or different precoding matrices, and the plurality of precoding resource units comprise one or both of a plurality of precoding time domain units or a plurality of precoding frequency domain units;

wherein the data are carried on M precoding resource units for repeated transmission, and N precoding resource units in the M precoding resource units adopt the same precoding matrix or adopt different precoding matrices; where both M and N are positive integers greater than or equal to 1; and M is greater than or equal to N;

wherein consecutive first precoding frequency domain units in a first time domain resource adopt a first precoding matrix, and consecutive second precoding frequency domain units in a second time domain resource adjacent to the first time domain resource adopt a second precoding matrix different from the first precoding matrix.

\* \* \* \* \*